United States Patent
Zieba et al.

(10) Patent No.: US 7,626,661 B2
(45) Date of Patent: Dec. 1, 2009

(54) POLARIZATION CONTROLLING ELEMENTS

(75) Inventors: Jerry Zieba, Santa Rosa, CA (US);
Thomas Mayer, Santa Rosa, CA (US);
David M. Shemo, Windsor, CA (US);
Markus Duelli, Santa Rosa, CA (US);
Kim Leong Tan, Santa Rosa, CA (US);
Karen Denise Hendrix, Santa Rosa, CA (US); Klaus Schmitt, Lörrach (DE)

(73) Assignees: JDS Uniphase Corporation, San Jose, CA (US); Rolic Ltd., Zug (CH)

( * ) Notice: Subject to any disclaimer, the term of this patent is extended or adjusted under 35 U.S.C. 154(b) by 873 days.

(21) Appl. No.: 11/006,379

(22) Filed: Dec. 7, 2004

(65) Prior Publication Data
US 2005/0128380 A1    Jun. 16, 2005

Related U.S. Application Data

(60) Provisional application No. 60/589,167, filed on Jul. 19, 2004, provisional application No. 60/587,924, filed on Jul. 14, 2004, provisional application No. 60/529,315, filed on Dec. 11, 2003.

(51) Int. Cl.
*G02F 1/1335* (2006.01)
(52) U.S. Cl. .................................. 349/117; 349/118
(58) Field of Classification Search ................. 349/117, 349/118
See application file for complete search history.

(56) References Cited

U.S. PATENT DOCUMENTS

| | | | |
|---|---|---|---|
| 5,278,680 A | 1/1994 | Karasawa et al. | |
| 5,375,006 A | 12/1994 | Haas | 359/73 |
| 6,160,597 A | 12/2000 | Schadt et al. | 349/98 |
| 6,215,539 B1 | 4/2001 | Schadt et al. | 349/124 |
| 6,348,959 B1 * | 2/2002 | Melnick et al. | 349/110 |
| 6,585,378 B2 | 7/2003 | Kurtz et al. | |
| 6,649,230 B1 * | 11/2003 | Seiberle et al. | 428/1.2 |

(Continued)

FOREIGN PATENT DOCUMENTS

EP    0621499    10/1994

(Continued)

OTHER PUBLICATIONS

Seiberle et al., "Invited Paper: Phot-Aligned Anistropic Optical Thin Films", SID Int'l Symposium 2003, May 18-23, 2003, pp. 1162-1165.

(Continued)

*Primary Examiner*—David Nelms
*Assistant Examiner*—David Y Chung
(74) *Attorney, Agent, or Firm*—Allen, Dyer, Doppelt, Milbrath & Gilchrist, P.A.

(57) ABSTRACT

The invention relates to a polarization compensating element (PCE) for a liquid crystal, e.g. liquid crystal on silicon (LCoS), display system manufactured using a linearly photo-polymerizable polymer (LPP) for orienting a photo-polymerizable liquid crystal polymer (LCP) film. To decrease the reflection, polarization conversion, and interference events in an LPP/LCP assembly the $\Delta N$ birefringence value of the LCP material is minimized. Dielectric coatings are added at various locations throughout the assembly for minimizing the amount of reflection, polarization conversion, and interference effects and for suppressing spatial retardance ripples.

19 Claims, 26 Drawing Sheets

U.S. PATENT DOCUMENTS

| | | |
|---|---|---|
| 6,857,747 B2 | 2/2005 | Pentico et al. |
| 2005/0045799 A1 | 3/2005 | Deng et al. |
| 2005/0128391 A1 | 6/2005 | Tan et al. |

FOREIGN PATENT DOCUMENTS

| | | |
|---|---|---|
| EP | 0 887 667 A2 | 12/1998 |

OTHER PUBLICATIONS

Kawatsuki et al., "Photocontrol of Birefringence and In-Plane Molecular Orientation in Co[polymer Crystal Films with 4-Methoxyazobenzene and Photo-Cross-Linkable Side Groups", Macromolecular Chemistry and Physics, Mar. 25, 2003, vol. 204, No. 4, pp. 584-590.

Bachels et al., "Novel Photo-Aligned LC-Polymer Wide-View Film for TN Displays", SID Conference Record of the International Display Research Conference 2002, 2002, pp. 183-186.

Tan et al, "Design and Characterization of a Compensator for High Contrast LcoS Projection Systems", 2005 SID International Symposium Digest of Technical Papers, Boston MA, May 24-27, 2005, SID International Symposium Digest of Technical Papers, San Jose, CA, SID, US, vol. Book II, vol. 36, May 24-27, 2005, pp. 1810-1815.

Chen et al, "General methodology for LcoS Panel Compensation", Journal of Society for Information Display (SID), vol. 12, No. 4, 2004, pp. 423-428.

Tyan R-C et al, "Polarizing Beam Splitter based on the Anisotropic Spectral Reflectivity Characteristic of Form-Birefringent Multilayer Gratings", Optics Ltrs, OSA, Optical Society of America, Washington, DC, Vo. 21, No. 10, May 15, 2006, pp. 761-763.

Joubert et al, TN-LCD Compensation Film with Holographic Form Birefrigence Proceedings of $18^{th}$ International Display Research Conf., Asia Display 98, Seoul, Sep. 28-Oct. 1, 1998, International Display Research Conf. IDRC, San Jose, CA: SID, US, Voln. CONf. 18, Oct. 28, 1998, pp. 1119-1122.

Robbie et al, "Ultrahigh Vacuum Glancing Angle Deposition System for Thin Films with Controlled Three-Dimensional Nanoscale Structure", Rev. Sci. Instrum. 75(4), pp. 1089-1097, 2004.

Pentico et al, "Ultra High Contrast Color Management System for Projection Displays", SID 03 Digest, pp. 130-133, 2003.

Anderson et al, "Off-Axis LcoS Compensation for Enhanced Contrast", SID 03 Digest, pp. 1433-1435, 2003.

Haggans et al, "Effective Medium Theory of Zeroth Order Lamellar Gratings in Conical Mountings", J. Opt. Soc. Am. A, 10, pp. 2217-2225, 1993.

S-T. Wu, J. Appl. Phys., 76 (10), pp. 5975-5980, 1994.

Hong et al, "Precision Compensation for Polarization Anisotropies in Metal Reflectors", Opt. Eng. 43(6) pp. 1276-1277, 2004.

Berreman, "Optics in Stratified and Anisotropic Media: 4×4 Matrix Formulation", J. Opt. Soc. Am. 62, pp. 502-510, 1972.

Eblen et al, SID'94 Digest, p. 245, 1994.

Rytov, "Electromagnetic Properties of Finely Stratified Medium", Soviet Physics JETP, 2, p. 461, 1956.

Gu et al, "Form Birefringence Dispersion in Periodic Layered Media", Optics Letters, vol. 21, No. 7, 1996, pp. 504.

"P-155: High Performance Contrast Enhancing Films for VAN-Mode LCoS Panels" by Duelli et al.; 2005 SID International Symposium, Boston, MA; May 24-27, 2005, SID 05 Digest, pp. 892-895.

"28.3: General Methodology for LCoS Panel Comepnsation" by Chen et al.; .; 2004 SID International Symposium, Seattle, WA; May 25-27, 2004, SID 04 Digest, pp. 990-993.

"Ultra High Contrast Color Management System for Projection Displays" by Pentico et al.; SID International Symposium, vol. 34, 2003, SID 03 Digest, pp. 130-133.

\* cited by examiner

Type C plate

Type O plate

Type O plate on top of Type A plate

POLARIZATION CONTROLLING ELEMENTS

CROSS-REFERENCE TO RELATED APPLICATIONS

The present invention claims priority from U.S. Patent Applications Nos. 60/529,315 filed Dec. 11, 2003; 60/587,924 filed Jul. 14, 2004; and 60/589,167 filed Jul. 19, 2004, which are incorporated herein by reference.

TECHNICAL FIELD

The present invention relates to a polarization controlling element (PCE) for liquid crystal display systems, and in particular to a trim retarder PCE, which uses a linearly photo-polymerizable polymer (LPP) to orient a photo-polymerizable liquid crystal polymer (LCP) film for increasing contrast of a liquid crystal on silicon (LCoS) micro-display based projection display system

BACKGROUND OF THE INVENTION

With reference to FIG. 1, a conventional LCoS projection system includes a light source 6 for generating a high power beam of light, and a polarization conversion light pipe (PCLP) 7 for ensuring substantially all of the light is linearly polarized, e.g. horizontally polarized. A first lensing element 8a passes the beam of light to a first folding mirror 9a, which directs the beam of light at a first dichroic filter 10. The first dichroic filter 10 separates out green light from the remaining light, and directs the green light via second and third lensing elements 8b and 8c, and second and third folding mirrors 9b and 9c to a first LCoS display panel 15a. Prior to entering the first LCoS display panel 15a, the green light passes through a first polarizer 20a, such as a wire grid polarizer, and a first trim retarder PCE 21'. The polarization of a desired amount of the green light is rotated by the first display panel 15a, e.g. by 90° to horizontal polarization, whereby upon reflection the desired amount of green light is reflected by the first polarizer 20a towards the color cube 19 for transmission via the projection lens 18 onto a screen (not shown).

The remaining light is directed via fourth and fifth lensing elements 8d and 8e, and a fourth folding mirror 9d to a second dichroic filter 12, which separates the remaining light into blue and red light. The red light is directed through a second polarizer 20b and a second trim retarder PCE 21" to a second LCoS display panel 15b. As above, the second display panel rotates the polarization of the desired amount of red light, whereby the polarizer 20b reflects the red light to the color cube 19 for transmission via the projection lens 18 onto the screen (not shown).

Similarly, the blue light passes through a third polarizer 20c and a third PCE 21''' to a third LCoS display panel 15c. The polarization of a desired amount of blue light is rotated, whereby upon reflection, the blue light is reflected by the third polarizer 20c to the color cube 19 for transmission via the projection lens 18 onto the screen (not shown).

LCoS micro-displays typically have some residual birefringence in the dark (off-) state due to the orientation of the liquid crystal (LC) molecules in the LCoS cell. Thus, the linearly polarized light that illuminates the micro-display is slightly elliptically polarized upon reflection, which leads to dark state light leakage onto the screen, thereby limiting the contrast of the projection system. To improve the system contrast and compensate for the residual retardance, the trim retarder PCE 21' is placed in the light path in front of the LCoS display panel 15a. Unlike a conventional ½λ waveplate, a trim retarder provides only about 1 nm to 50 nm of retardance. The PCE 21' prepares the polarization state of the illuminating light, whereby upon reflection from the LCoS display panel 15a back through the PCE 21' the polarization state of the reflected light is effectively unchanged, i.e. rotated back to its original state of polarization, and no light is leaked onto the screen. It is also important that the polarization state of light reflected off of the PCE 21' is effectively unchanged or it will contribute to a loss in system contrast.

U.S. Pat. No. 6,215,539 issued to Schadt et al on Apr. 10, 2001, and U.S. Pat. No. 6,160,597 issued to Schadt et al on Dec. 12, 2000 teach a method of manufacturing birefringent films that effect the polarization state of light for use in conventional ¼λ and ½λ waveplates. A linearly photo-polymerizable polymer (LPP) is used to orient a photo-polymerizable liquid crystal polymer (LCP) film by coating a transparent low-birefringence substrate with a thin layer of the LPP, aligning the LPP layer by exposure to linearly polarized light, and coating the photo aligned layer of LPP with the LCP layer. During thermal treatment of the structure, the oriented LPP layer induces (nucleates) orientation in the photo-polymerizable LCP layer. The oriented photo-polymerizable LCP layer is then fixed by exposure to light of sufficient energy to cause photo-induced cross-linking thereof.

An object of the present invention is to overcome the shortcomings of the prior art by utilizing a LPP/LCP polarization film as a trim retarder PCE for an LC display panel.

Another object of the present invention is to provide a LPP/LCP PCE having a LCP layer with a low ΔN birefringence value.

Yet another object of the present invention is to reduce the amount of reflection and interference events in a LPP/LCP PCE by introducing dielectric layers at suitable material interfaces.

SUMMARY OF THE INVENTION

Accordingly, the present invention relates to a liquid crystal (LC) display assembly for reducing back-reflection polarization conversion comprising:

an LC display panel having residual birefringence in a dark state due to the orientation of liquid crystal molecules therein; and a polarization compensating element for at least partially compensating for the residual birefringence.

The polarization compensating element including a first polymeric photo aligned (LPP) layer; and a first cured photo-polymerizable liquid crystal polymer (LCP) layer mounted on said first LPP layer;

wherein an in-plane fast axis orientation of the first LCP layer is substantially azimuthally aligned at an angle between 0 and 90° relative to an in-plane slow axis of the LC display panel.

Another feature of the present invention relates to a trim retarder device for compensating residual in-plane birefringence of between 1 nm and 50 nm in a liquid crystal (LC) display panel comprising:

a first polymeric photo aligned (LPP) layer; and
a first cured photo-polymerizable liquid crystal polymer (LCP) layer having a relatively low in-plane ΔN birefringence value between 0.001 to 0.07 in the visible spectrum mounted on said first LPP layer.

BRIEF DESCRIPTION OF THE DRAWINGS

The invention will be described in greater detail with reference to the accompanying drawings which represent preferred embodiments thereof, wherein.

DETAILED DESCRIPTION

Figure 2:
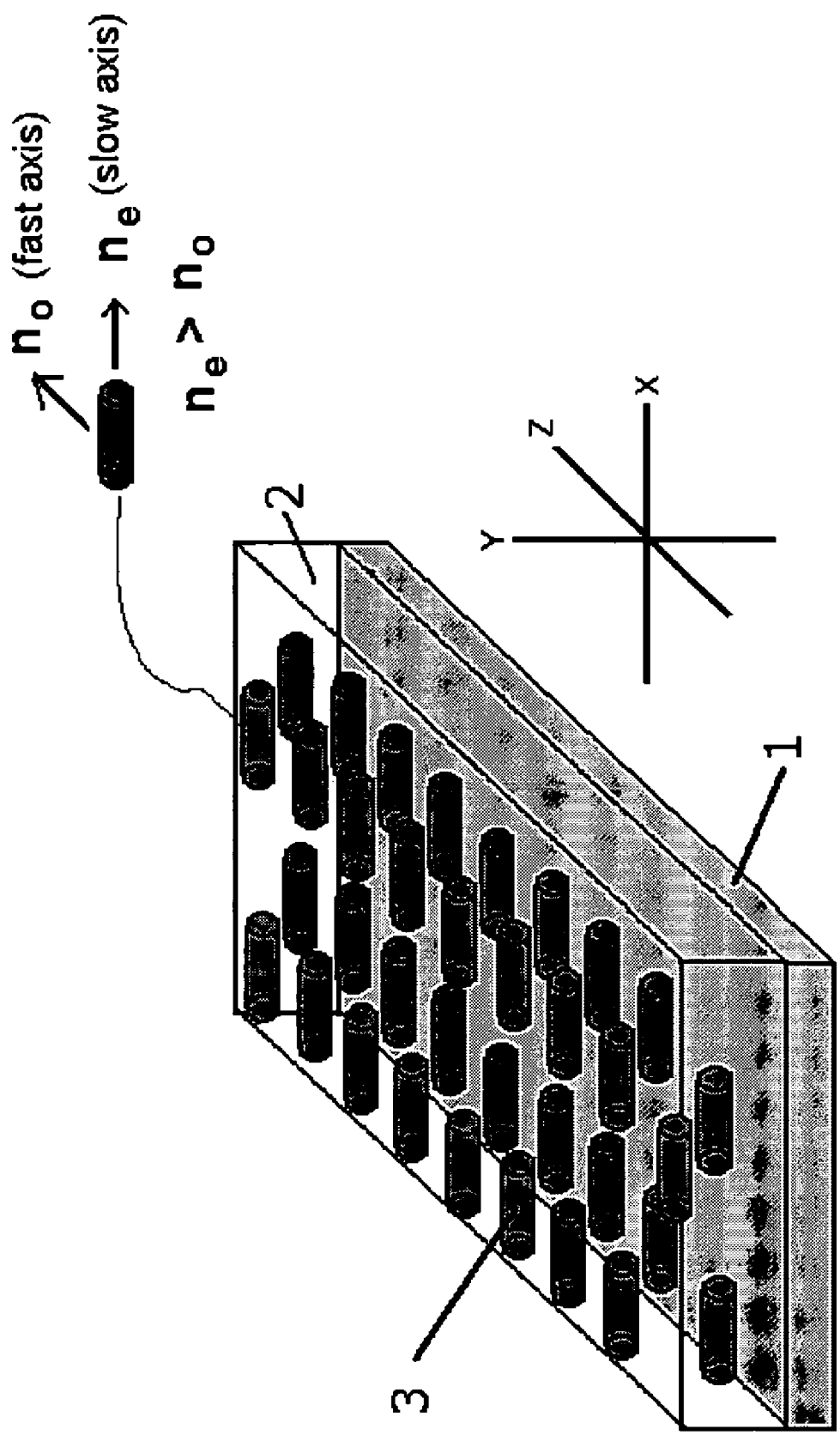
FIG. 2 is a schematic representation of a Type A LPP/LCP trim retarder according to the present invention.
Figure 3:
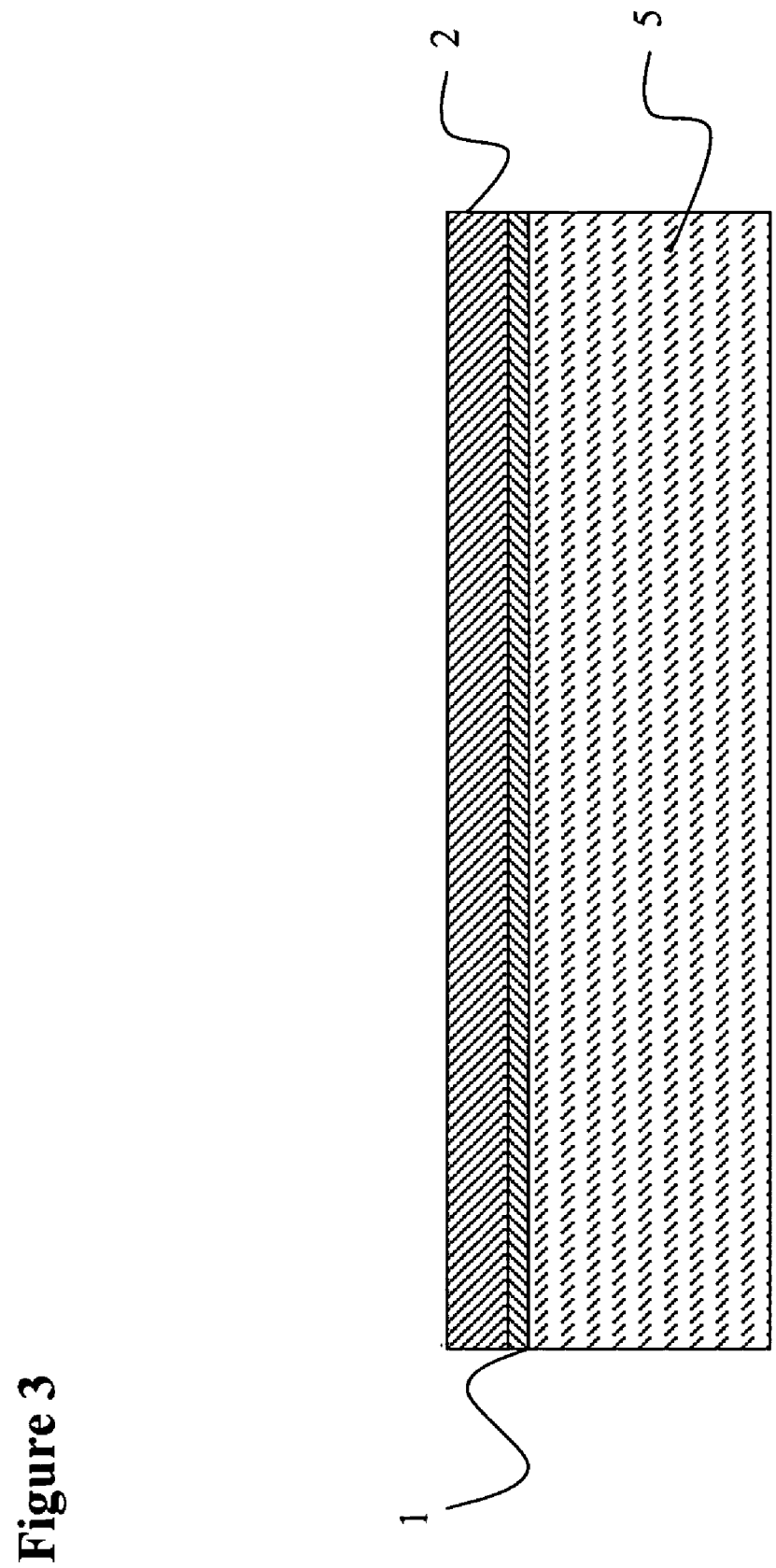
FIG. 3 is a side view of the trim retarder of FIG. 2.

With reference to FIGS. 2 and 3, a linearly photo-polymerizable polymer layer 1 (LPP) is used to orient a photo-polymerizable liquid crystal polymer (LCP) film 2 by first, coating a transparent low-birefringence substrate 5 with a thin layer of the LPP 1. The substrate 5 can be a silica-based glass, a silica based ceramic, sapphire, polycarbonate, polyester, polychlortrifluoroethylene or polycyclic olefins, and typically has an index of refraction of between 1.35 and 2.7 @ 589 nm. Typically, a cured LCP layer has indices of refraction between 1.43 and 1.75 measured at @ 589 nm. The LPP layer 1 can be coated using any suitable method, including spin coated, dip coated, curtain coated or meniscus coated aligning. The LPP layer 1 is then heated to evaporate solvent, and exposed to linearly polarized ultra-violet light to cross-link the LPP layer 1 with the desired molecular orientation. The LCP layer 2 is coated on the photo aligned LPP layer 1 using one of the aforementioned suitable coating methods. During subsequent thermal treatment of the structure, the oriented LPP layer 1 induces (nucleates) orientation in the photo-polymerizable LCP layer 2, represented as aligned LCP molecules 3 along the X axis, forming a Type A plate. The oriented photo-polymerizable LCP layer 2 is then fixed by exposure to ultra-violet or e-beam energy of sufficient energy to cause photo-induced cross-linking thereof. Additional heating can be done to evaporate any residual solvent. Additional heating for a period of less than 15 minutes at a temperature up to 175° C. can be done to evaporate any residual solvent present in the LCP layer 2. The LPP/LCP film can be laminated to a top surface of the LC display panel or separated therefrom by an air gap.

Optical elements using LPP/LCP birefringent film technology are manufactured relatively easily, and provide superior performance and stability compared to other types of liquid crystal (LC) or non LC based birefringent elements used as PCEs to correct for birefringence aberrations induced by LC based displays. The type and extent of compensation, which LCP/LPP PCE trim retarders exhibit to achieve the final orientation correction characteristics required for an individual projection display apparatus, may be controlled by varying the amount of light energy, the incident angle and/or the azimuthal orientation of incidence of the polarized light used to cure the LPP polymer, the thickness of an LCP layer, coating multiple pairs of LPP and LCP layers, varying the angle of incidence of the polarized light used to cure the individual LPP layers, and varying the chemical structure of the LPP and/or the LCP layers. Moreover, the assembly structure and the dielectric coatings also contribute to the type and extent of the compensation provided.

Figure 4:
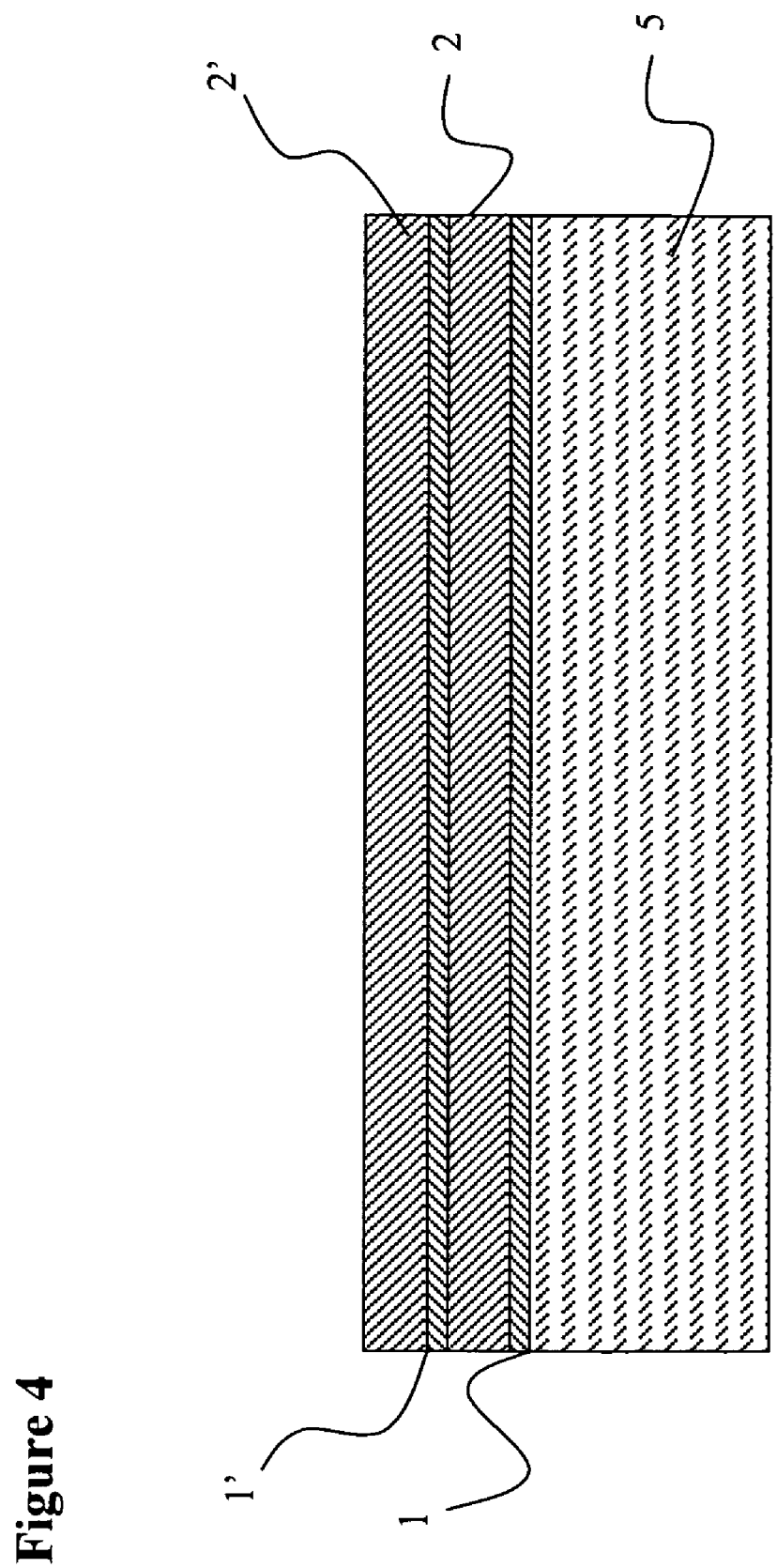
FIG. 4 is a side view of a multiple layer LPP/LCP trim retarder.
Figure 5:
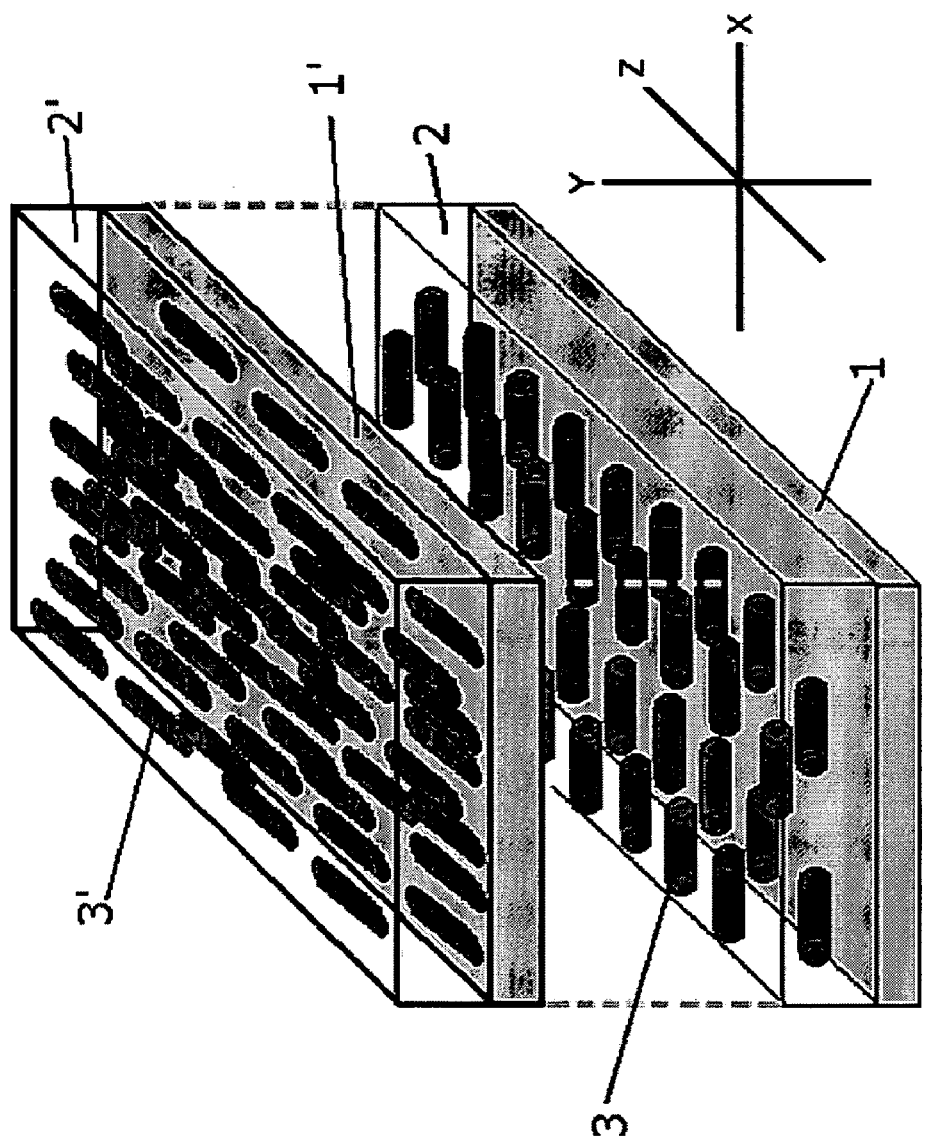
FIG. 5 is a schematic representation of an effective negative Type C LPP/LCP trim retarder.

FIGS. 4 and 5 illustrate a multiple layer plate, in which a second LPP layer 1' and a second LCP layer 2' are directly coated on previously deposited LPP and LCP layers 1 and 2, respectively. The optic axis of molecules 3 and 3' can have the same orientation or, as in FIG. 5, the orientation can be orthogonal. In this case, the LPP layer 1 and LCP layer 2 are formed as above, but the second LPP layer 1' is cured with linearly polarized light in the Z direction, whereby the molecules 3' in the LCP layer 2' become aligned along the Z axis. The particular arrangement in FIG. 5 forms an effective Type"-C" plate, which simulates a negative uniaxial material.

Figure 6:
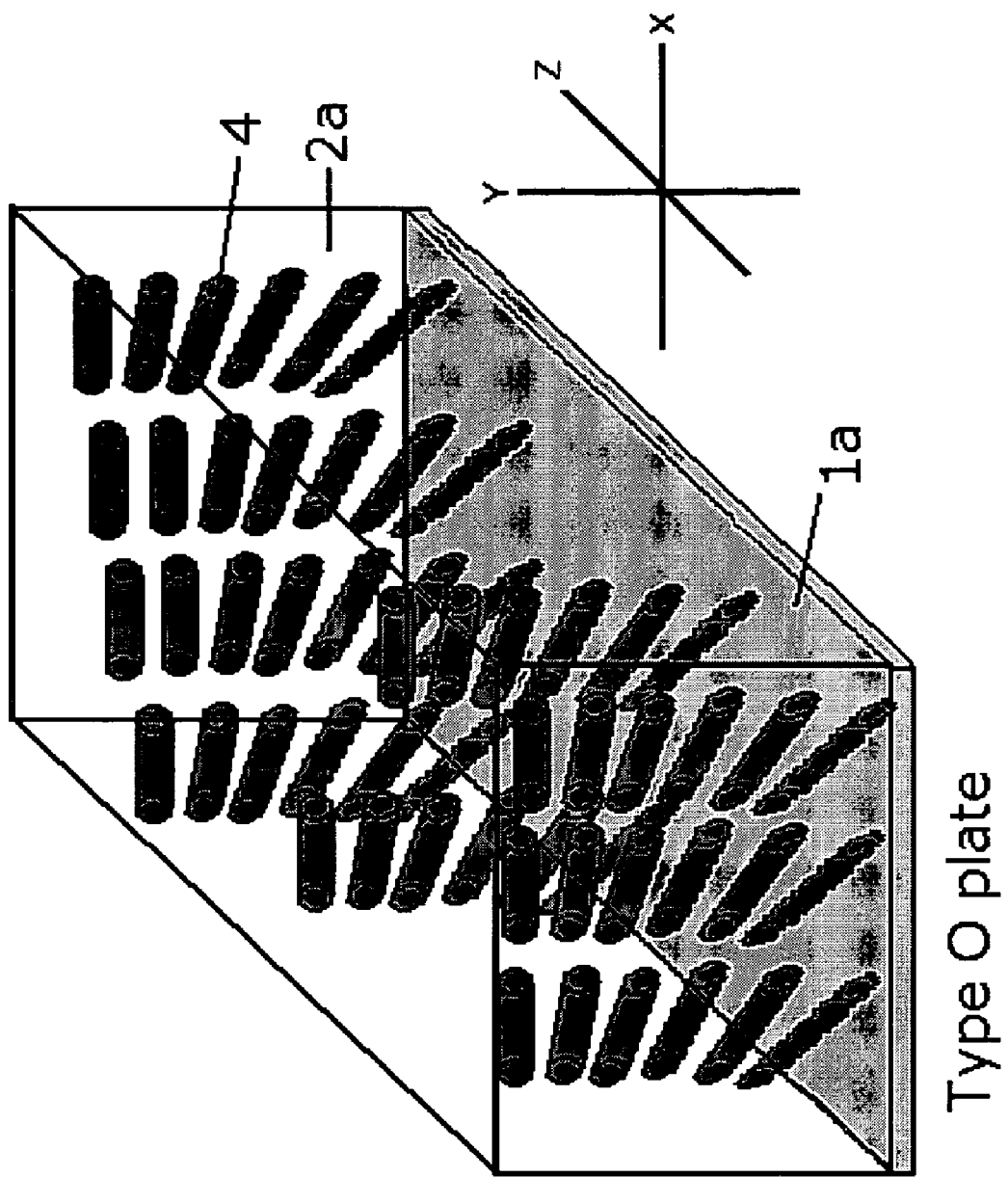
FIG. 6 is a schematic representation of a Type O LPP/LCP trim retarder.
Figure 7:
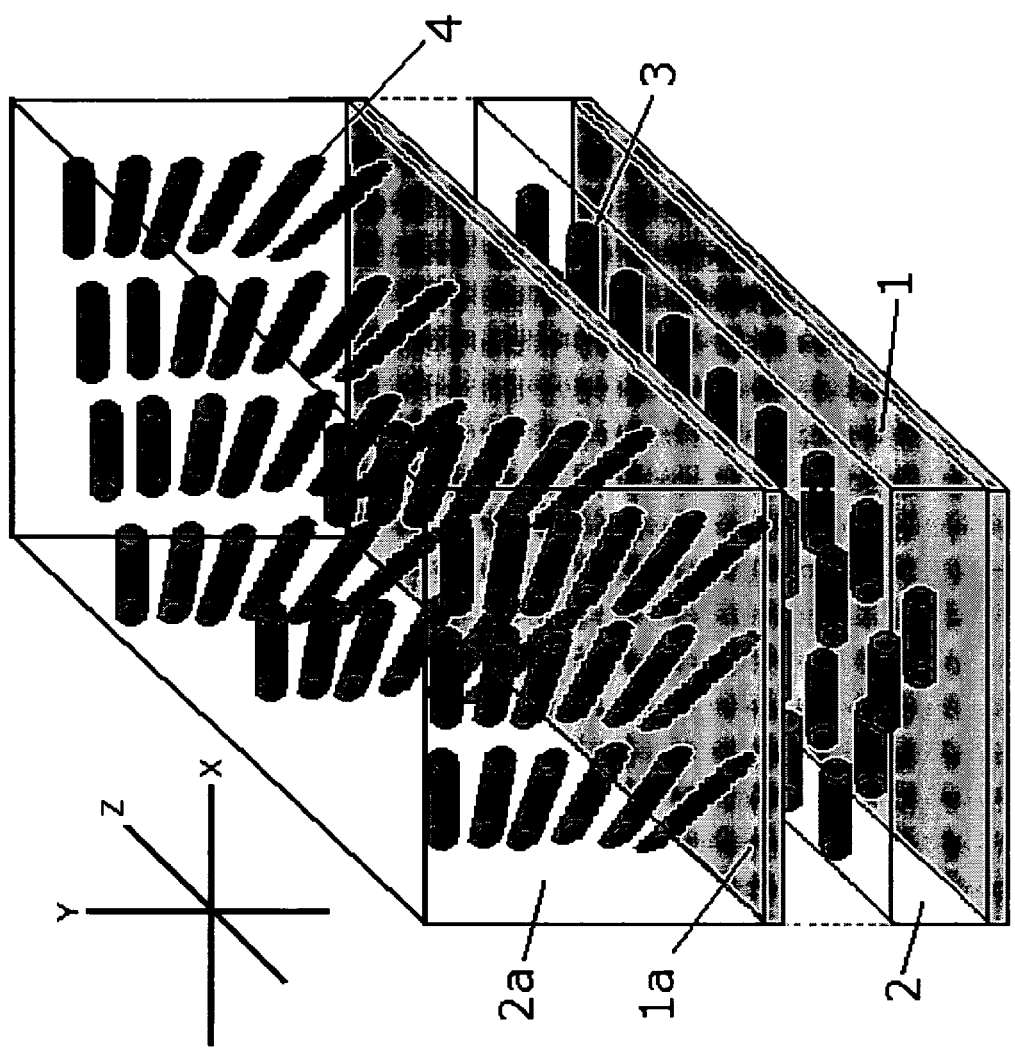
FIG. 7 is a schematic representation of a Type O trim retarder plate deposited on top of a Type A trim retarder plate.

A Type O plate is illustrated in FIG. 6, and includes an LPP layer 1a tilted at a fixed axis along the azimuth running parallel to the electric field of the linearly polarized light used to cure the LPP layer 1a. The rods 4 represent the optic axis, which start out at approximately 82° near LPP surface 1a. As you move away from the LPP surface 1a the tilt angel of the LCP optic axis decreases to about 50° at the top surface of the LCP layer 2a. Various other combination of layers are also possible, including the deposition of a Type O plate on top of a Type A plate, as illustrated in FIG. 7.

Figure 8:
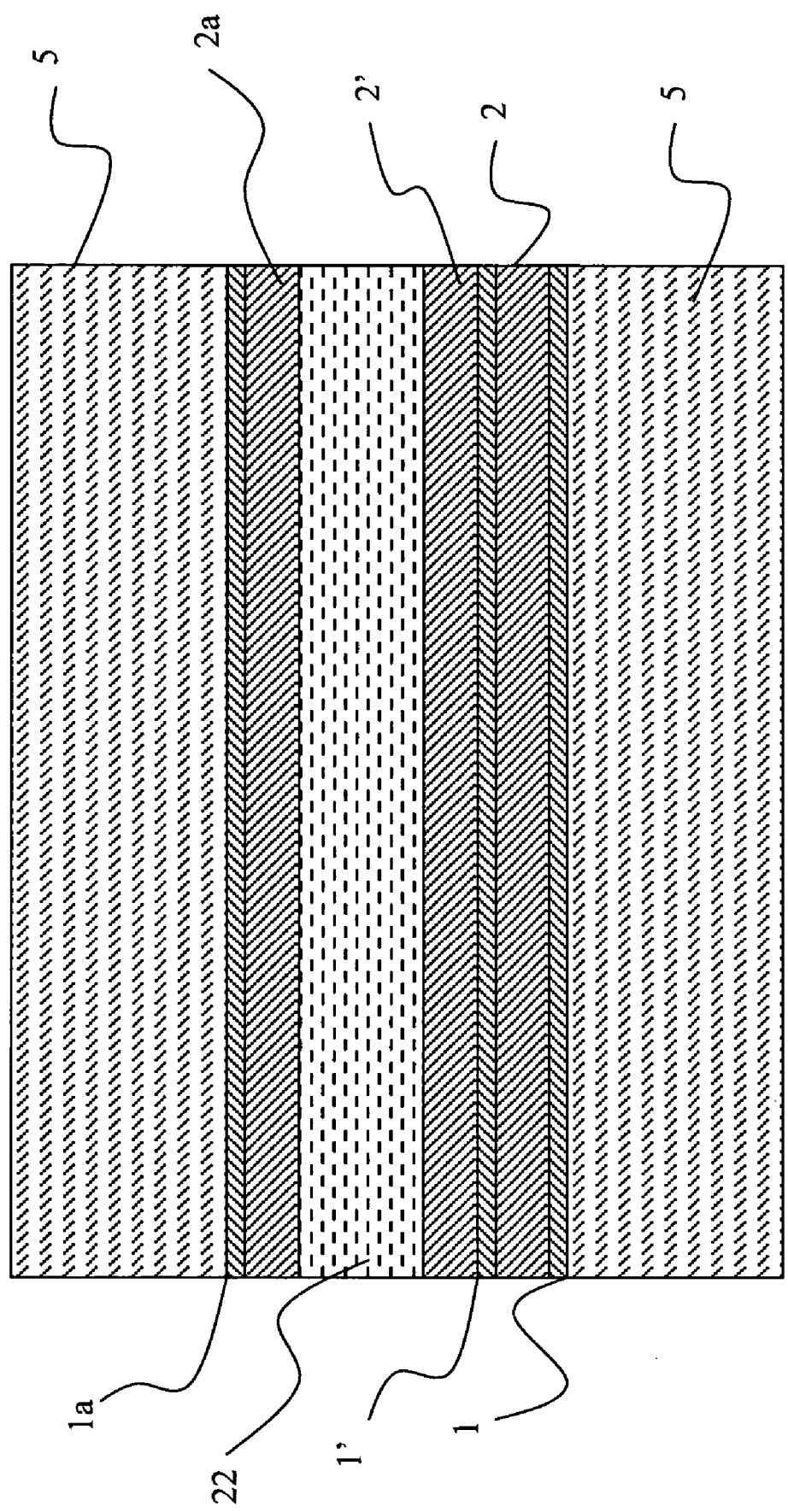
FIG. 8 is a side view of a Type C plate connected to a Type O plate.

As an alternative to coating multiple LPP/LCP layer pairs consecutively, combinations of single or multiple LPP/LCP pairs can be laminated together to form a single LPP/LCP trim retarder using a suitable adhesive. With reference to FIG. 8, the effective negative C plate of FIG. 5 is attached to a Type O plate of FIG. 6 using a suitable adhesive 22.

Figure 1:
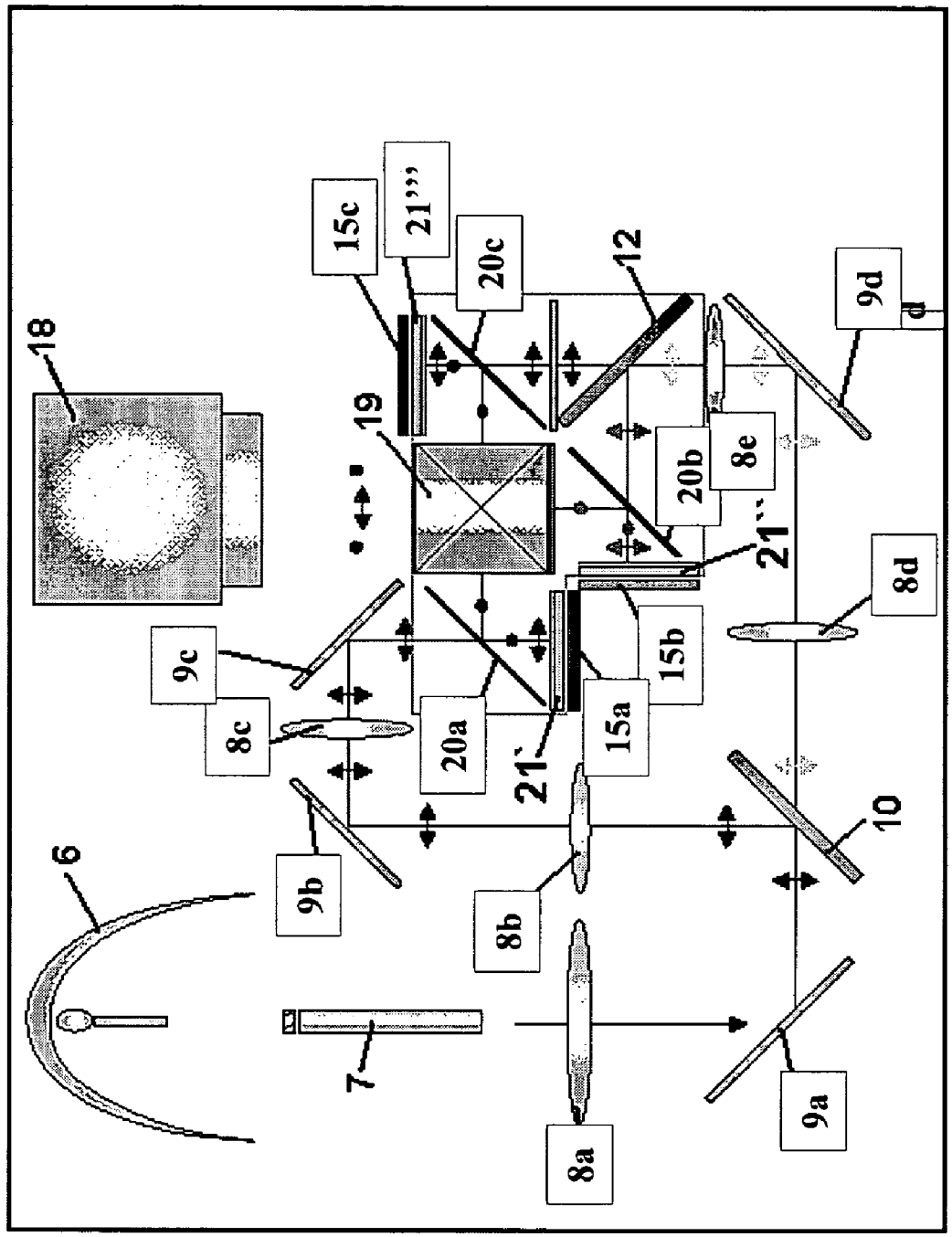
FIG. 1 is a schematic representation of a LCoS projection system.

Generally, in use, an in-plane fast axis orientation of the LCP layer 2 is azimuthally aligned nominally to an in-plane slow axis of the LCoS display panel, in which both the LCoS display panel and the LCP layer 2 have nominally the same input retardance magnitude. Alternatively, if the in-plane retardance of the LCP layer 2 is greater than the LCoS panel, the LCP layer 2 can be azimuthally aligned at an angle between 0° and 90° relative to slow axis of the LCoS display panel to provide equal in-plane retardances. The level of in-plane compensation required for an LCoS is determined by rotating a type A-plate of known polarization in the light illuminating and reflected back off of the display panel in the dark state until maximum contrast is obtained. The level of PCE in-plane compensation required for the specific LCoS display panel is the same as the amount of compensation introduced by the known type A-plate. While the present invention relates to compensating for residual birefringence in an LC display panel, if the aforementioned process is conducted after assembly of the entire projection system, as illustrated in FIG. 1, the trim retarder will actually compensate for any residual birefringence in the system, not just for in the LC display panel.

A detailed procedure for coating LPP/LCP pairs with a high intrinsic ΔN birefringence value LCP on substrates and producing a LPP/LCP trim retarder is as follows.

Clean a 100 mm×0.7 mm square piece of Corning 1737® glass. Spin coat a 48 nm thick film of LPP to the glass substrate (2% solids solution of Staralign 2100® Vantico AG) for 30 seconds @ 3000 RPM. Bake the LPP coated glass at 180° C. for 5 minutes. Expose the LPP to collimated linearly polarized UV light to align the LPP molecules therewith, e.g. 250 mJ/cm$^2$ at λ=300 nm to 340 nm, $\Phi_e$=0°=electric field orientation to substrate reference edge. Spin coat a LCP layer directly on top of the aligned LPP layer, e.g. 15% solids solution of ROF-5103® Vantico AG, for 60 seconds at 3350 RPM. Anneal the coated sample at 51° C. for 5 minutes. Expose the coated sample to 1 J/cm$^2$ of UVB light under nitrogen atmosphere, then bake the LPP/LCP pair at 160° C. for 10 minutes.

Retardance measurements were carried out using a Hinds Exicor 150AT® (@ λ~632.8 nm), with 1 mm spatial resolution. A 76 mm diameter area in the center of the sample was found to have an average retardance of 21.74 nm with a non-uniformity of +/−0.85 nm. The average orientation of the fast axis was 90.4° with a non-uniformity of +/−0.3°.

Unfortunately, LPP/LCP trim retarders based upon typical LPP/LCP birefringent film pairs have significant light leakage that limits the achievable contrast, due to light which is back reflected with a partially converted polarization state from the LPP/LCP trim retarder itself. The back-reflected, polarization-converted light is due to a mismatch between the refractive indices on the interfaces between the cured LCP layer 2, the cured LPP alignment layer 1, the substrate 5, the air and the laminating adhesive (if used). In general terms, these effects represent combinations of reflection and interference events that lead to changes in the retardance value and undesired changes in the polarization of the light passing through or reflecting off of the PCE, thereby degrading the performance of the LPP/LCP trim retarder.

Figure 9:
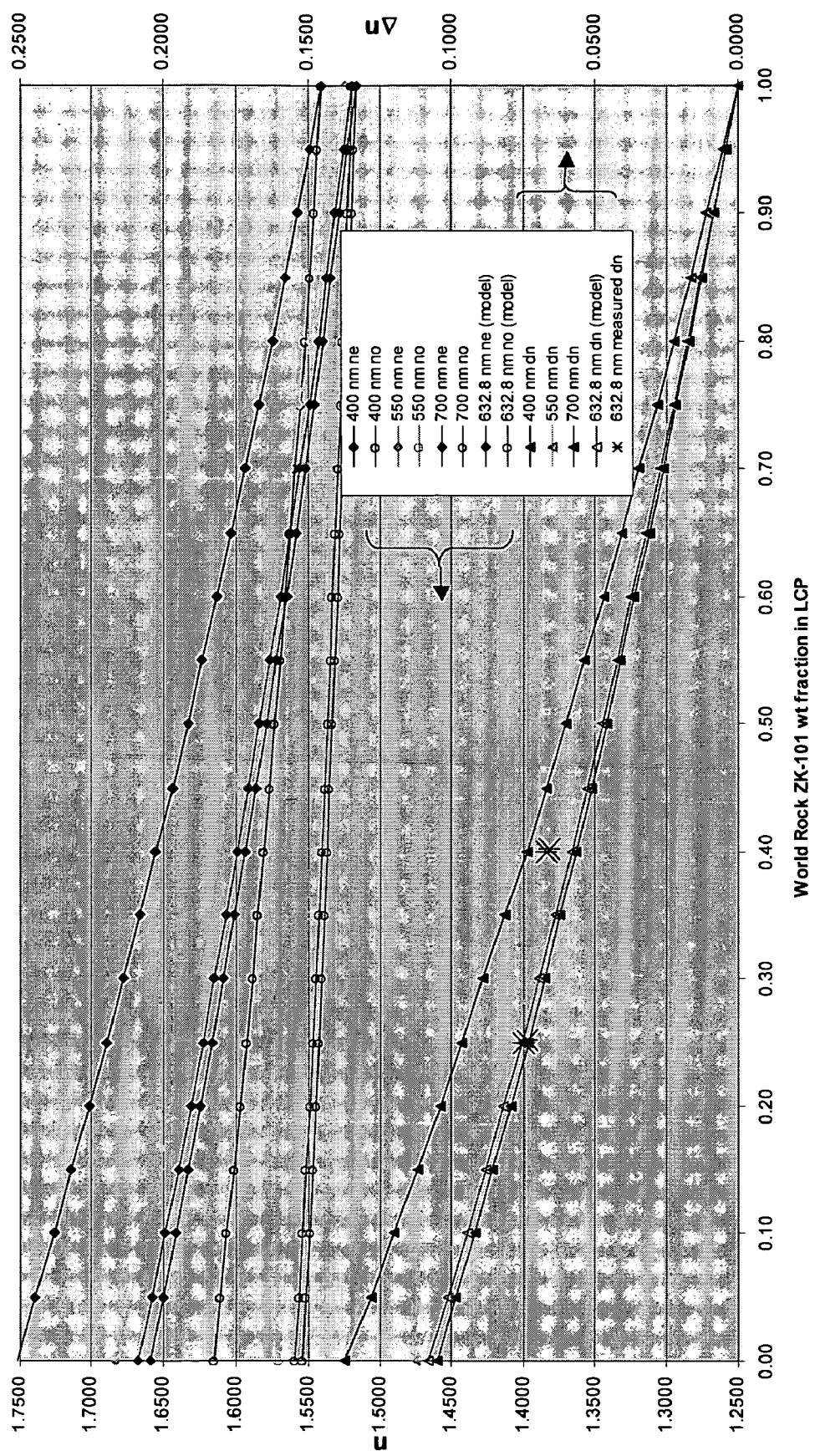
FIG. 9 is a plot of the calculated and measured $n_e$, $n_o$, and $\Delta N$ vs. LCP films with different weight per cent of isotropic diluent.

Commercial LPP/LCP films have relatively high ΔN birefringence values, for example LPP/LCP films using LCP Opalva 2130® (Vantico AG) have ΔN birefringence values >0.141 in the blue to >0.107 in the red. One of the important properties of LCP layers in conventional applications, e.g. for LC display polarizing filters, is having a high ΔN birefringence value, which is desirable for several reasons. The ability of LPP layers to induce orientation in a LCP layer is thickness limited, i.e. beyond a certain thickness of LCP layer the ability of the LPP layer to induce a controlled level of orientation in a LCP layer is diminished. Furthermore, spin coating is a desired method of application for LPP/LCP coatings; however, beyond a specific thickness it becomes difficult to cure LCP films because of optical absorption properties of the photo-initiators and the LCP polymer. As a result, manufacturers have focused their efforts on developing LCP materials that have high ΔN birefringence values, which enable a relatively thin single pair of LPP/LCP films to be manufactured for LC display polarization filter applications. FIG. 9 illustrates the effects of increasing the amount of isotropic diluents on the refractive indices $n_e$ and $n_o$.

LPP/LCP trim retarders made by known processes yield some level of contrast improvement in display applications when used as polarization compensation elements; however, the level of back reflection polarization conversion and interference events intrinsic to state of the art LPP/LCP films was found to be inferior to other types of materials used for compensation elements in display applications.

The high level of in-plane birefringence in LPP/LCP trim retarders manufactured with high ΔN LCP material causes the polarization state of the reflected light to become partially converted because of the difference in reflection coefficients of the ordinary and extraordinary waves. The difference in reflection coefficients between the two waves makes it impossible to index match the LPP/LCP surface interfaces with any single material.

One way to decrease the reflection and interference events in a LPP/LCP trim retarder is to minimize the ΔN birefringence properties of the LCP material, thereby closing the gap between the reflection coefficients of the ordinary and extraordinary waves, which lessens the back reflection and polarization conversion of the reflected light. Furthermore, minimizing the difference in reflection coefficients makes it possible to more closely match an anti-reflection (AR) coating thereto. AR coatings can only be optimized for one index of refraction, which in this case will be the average index of refraction between the ordinary and extraordinary indices of refraction. By reducing the difference between the ordinary and extraordinary indexes of refraction, the index of refraction of the AR coating becomes more closely matched to both. Conventional LCPs available for LPP/LCP coatings have intrinsically high ΔN birefringence values, e.g. >0.141 in the blue to >0.107 in the red. Accordingly, ΔN birefringence values below the aforementioned conventional values and above 0.0001 are desired; however, values between 0.07 and 0.0001 are particularly useful, but values between 0.05 and 0.0001 and between 0.02 and 0.0001 in the visible spectrum are also useful for LPP/LCP trim retarders. In accordance with the present invention, the ΔN birefringence values of LPP/LCP coating, made from material with intrinsically high ΔN birefringence values, can be treated to lower their ΔN birefringence values. Low effective in-plane ΔN birefringence can also be achieved using O-plate type LPP/LCP trim retarders.

In a first example, small quantities of isotropic organic compounds are introduced to the LCP layer to decrease the ΔN birefringence values of the LPP/LCP trim retarder. The isotropic organic compounds can be formulated into the LCP layer before coating or by immersing a practically cured LCP layer in the isotropic compound, and subsequently exposing the LCP layer to a second dose of UV radiation to complete the curing. Preferably, the isotropic compound is selected to be capable of reacting with the LCP layer to prevent the migration of the LCP out of the cured film. Any isotropic formulation based upon compounds containing monomeric acrylate functional groups, that are physically compatible with the LCP formulation, will decrease the in-plane ΔN birefringence values. One such LCP formulation consists of 60% by weight ROF-5103®, Vantico AG., and 40% by weight of a mixed UV curing acrylate base adhesive, World Rock ZK-101®, Kyoritsu Chemical & Co. Ltd. A PCE produced using this formulation had a measured in-plane ΔN birefringence value of 0.067 @ 632.8 nm compared to the measured in-plane ΔN birefringence value of 0.1078 @ 632.8 nm of a PCE based upon an LCP layer make from neat ROF-5103®.

Figure 10:
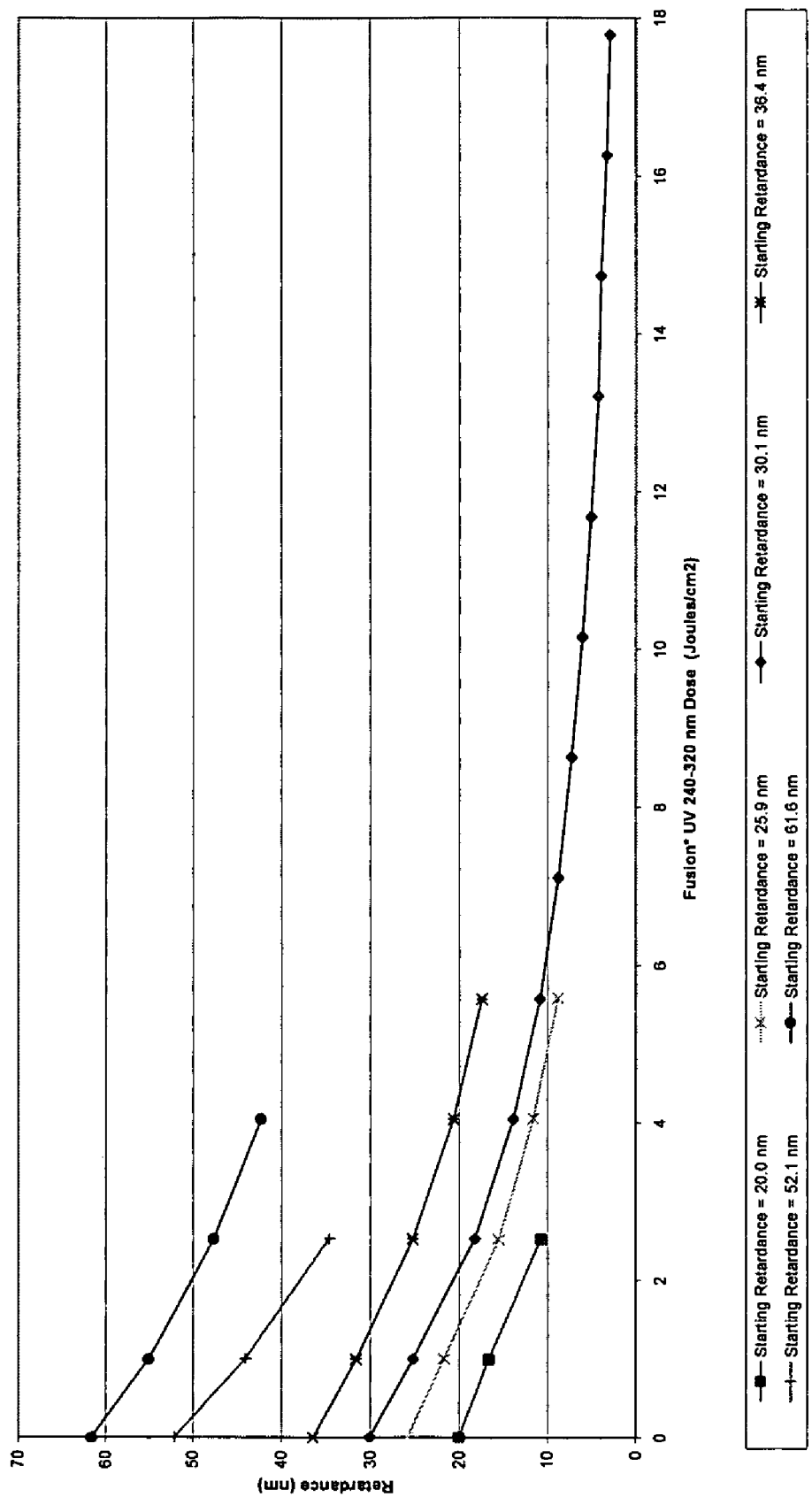
FIG. 10 is a plot of retardance for LPP/LCP retarders vs ultra-violet energy beyond that necessary to cure the LCP layer.
Figure 11:
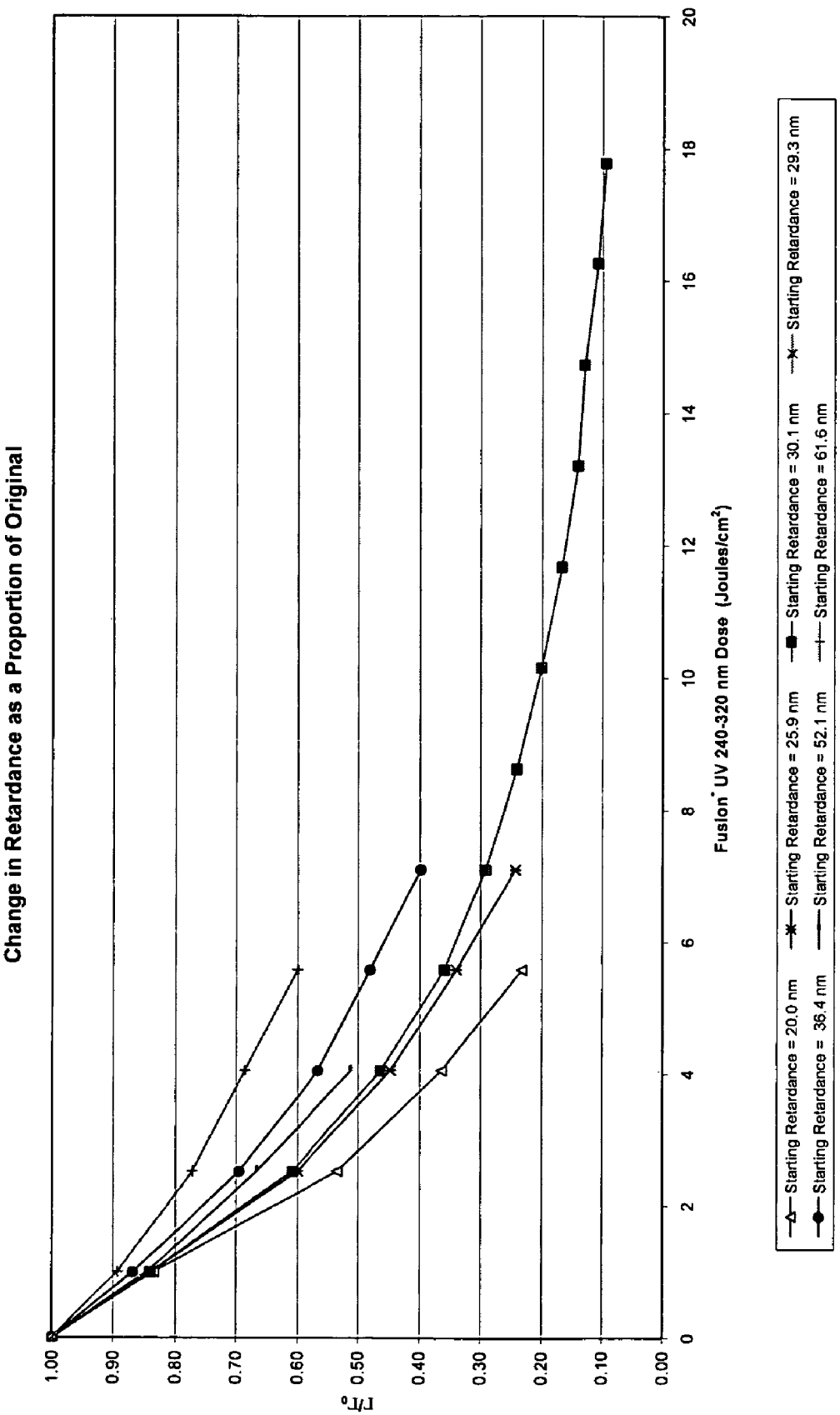
FIG. 11 is a plot of relative loss in retardance for LPP/LCP retarders vs. ultra-violet energy beyond that necessary to cure the LCP layer.
Figure 12:
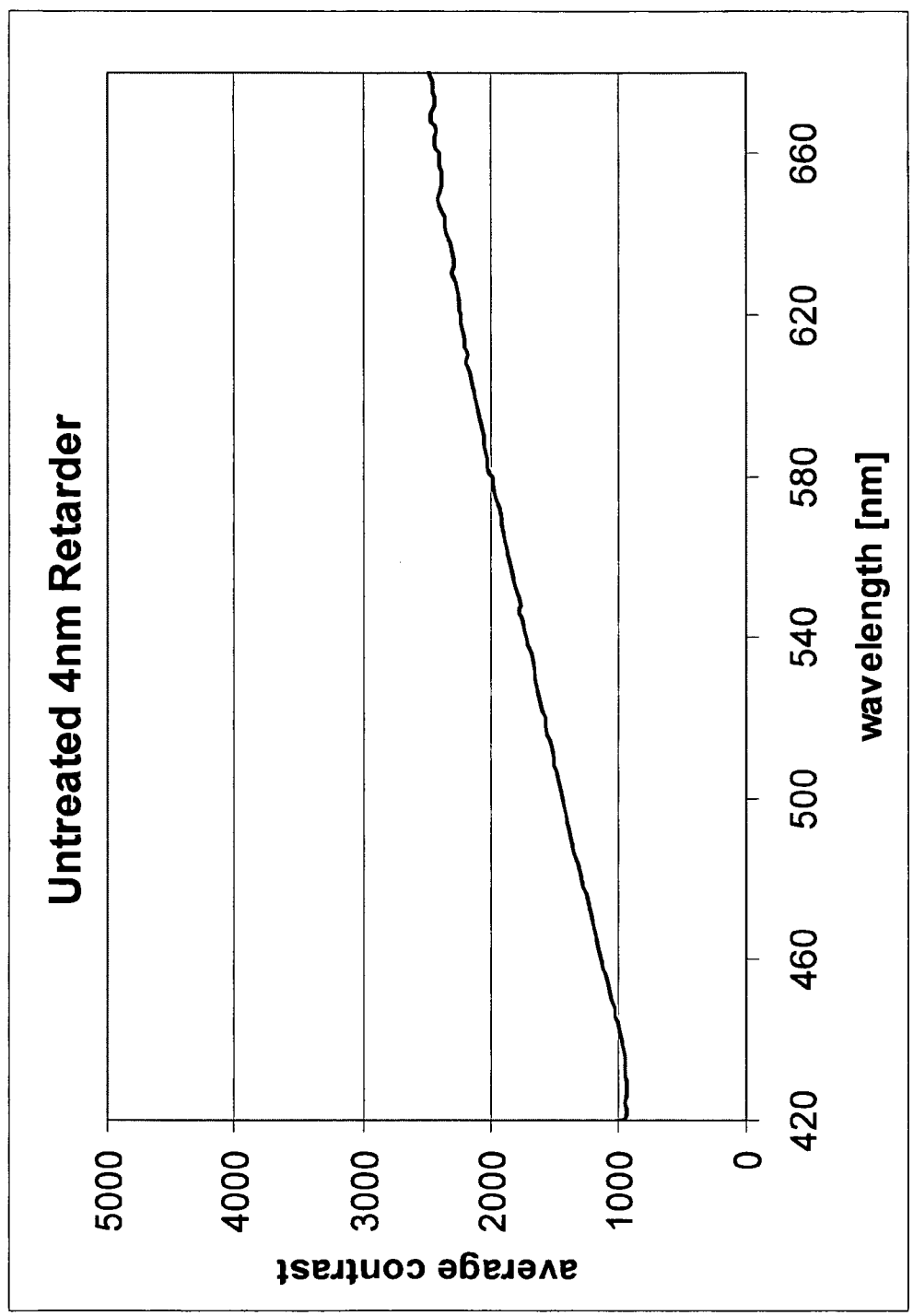
FIG. 12 is a plot of average contrast vs. wavelength of an untreated 4 nm LPP/LCP trim retarder.
Figure 13:
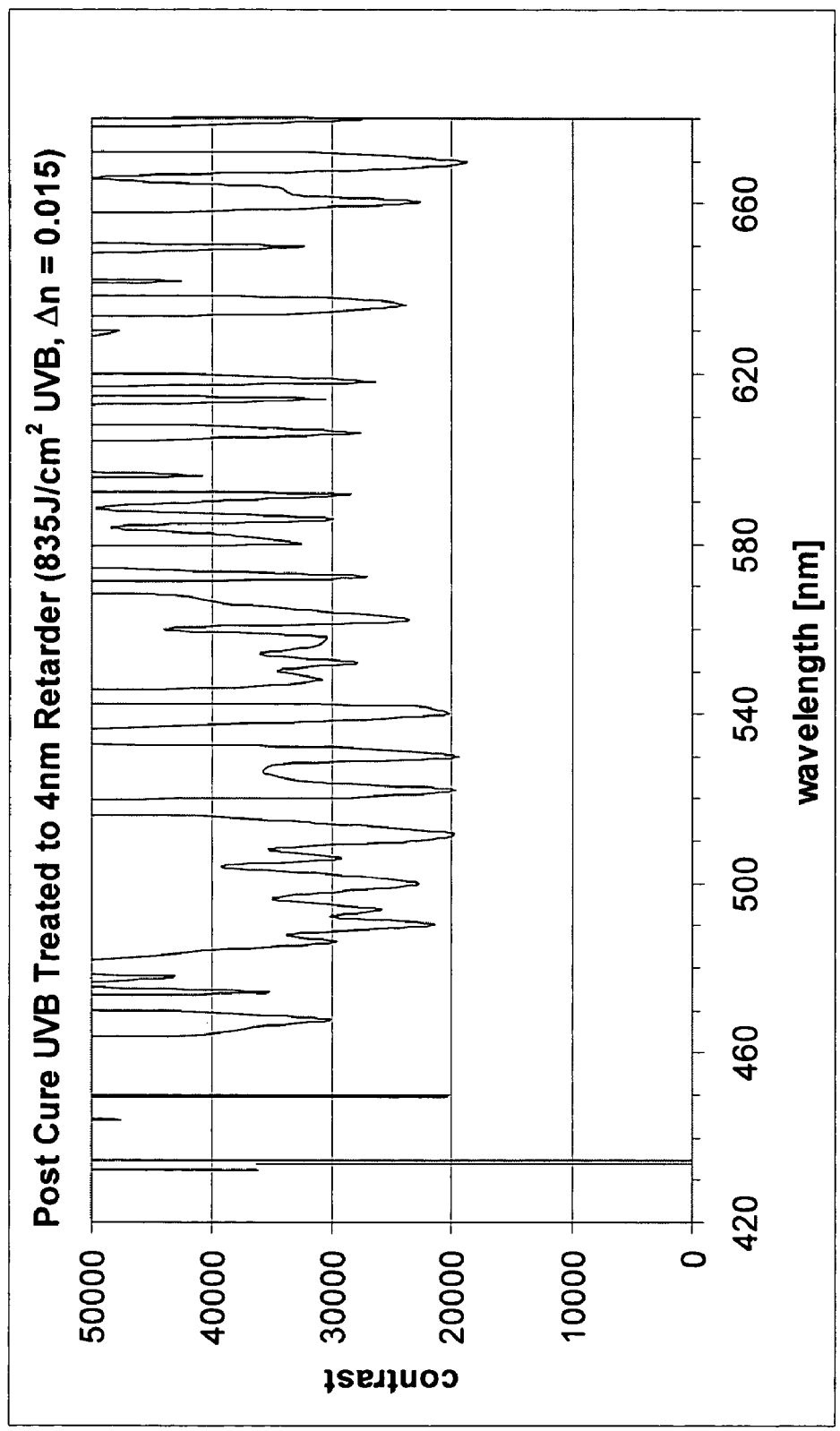
FIG. 13 is a plot of contrast of an LPP/LCP trim retarder exposed to ultra-violet radiation to reduce the $\Delta N$ birefringence value vs. wavelength.
Figure 14:
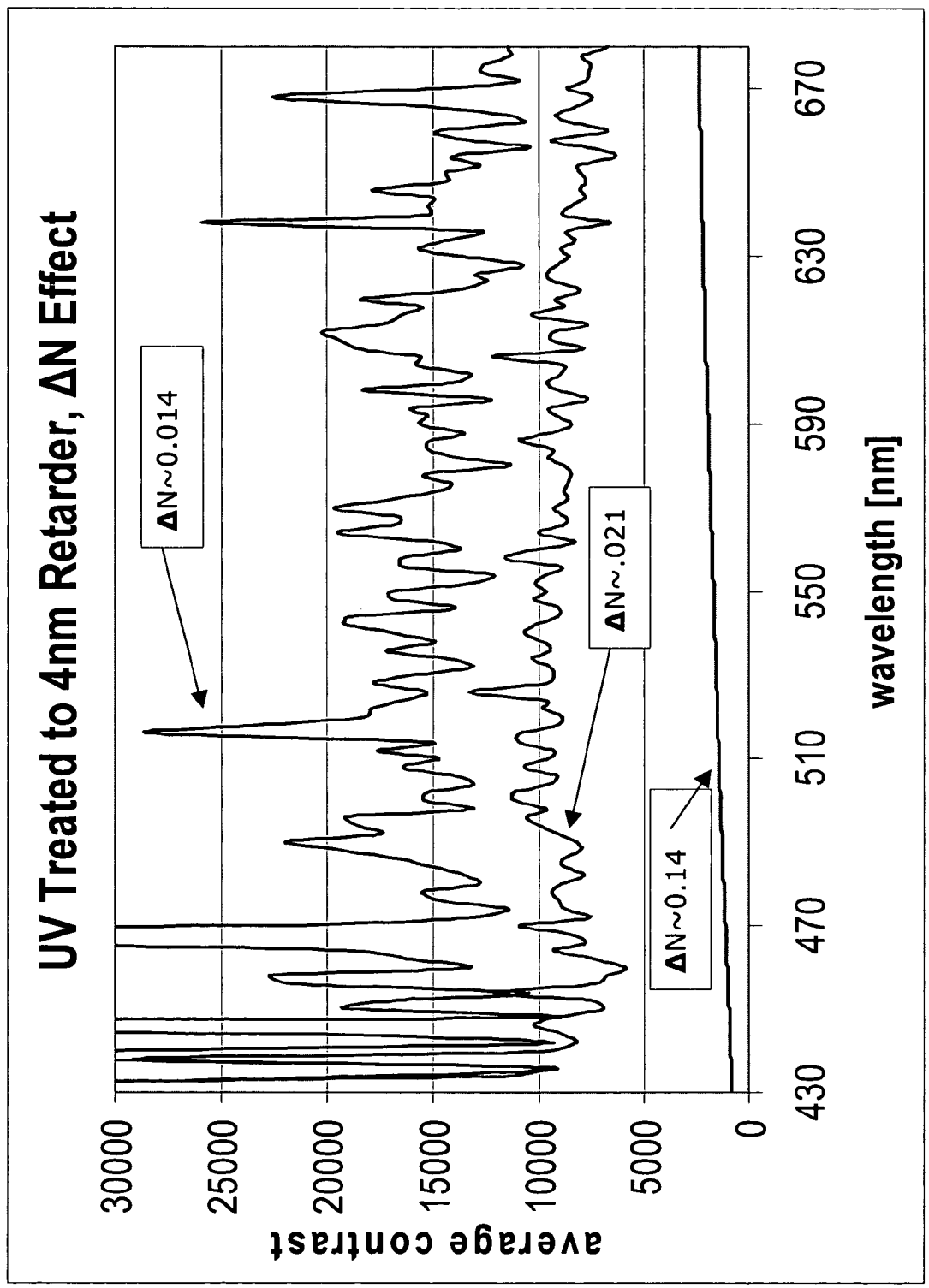
FIG. 14 is a plot of average contrast of UV-treated and untreated LPP/LCP trim retarders vs. wavelength.

The in-plane ΔN birefringence of LPP/LCP trim retarders and cured LPP/LCP layers can also be decreased by exposing them to UV radiation or e-beam energy at levels beyond that required to complete cross linking of the LCP layer, preferably at wavelengths less than 340 nm. FIGS. 10 and 11 illustrate the decrease in in-plane retardance, i.e. a decrease in in-plane ΔN, for LPP/LCP PCE's of various starting in-plane retardance values induced by extend exposure to UV energy. In contrast to an untreated PCE retarder, illustrated in FIG. 12, a PCE retarder treated with 835 J/cm$^2$ of UVB energy until the in-plane ΔN is lowered to 0.015, as in FIG. 13, consistently provides a contrast over 20000. FIG. 14 compares the average contrast for an untreated PCE retarder with an in-plane ΔN of 0.14 to that of UV treated PCE retarders with in-plane ΔN's of approximately 0.021 and 0.014.

A detailed example of a method for manufacturing a LPP/LCP trim retarder with low ΔN birefringence properties due to increase exposure to UV energy is as follows. Clean a 50 mm round 1 mm thick Fused silica substrate. Spin coat for 60 seconds at 3000 rpm with approximately 5 nm thick film of LPP, e.g. type SA2100® 2% in cyclopentanone, diluted to 0.5 wt % in cyuclopentanone). Bake the LPP film for 5 minutes at 180° C. Align the LPP by exposure to collimated linearly polarized light, e.g. 40 mJ/cm$^2$ @ wavelength approximately 300 nm to 340 nm, azimuthal orientation 0°, at normal incidence. Apply an LCP layer by spin coating directly on top of the LPP layer for 120 seconds @3000 rpm, e.g. type ROF-5103/25A® (25 wt %), diluted to 15 wt % in anisole, (Vantico AG). Anneal the coated sample at 51° C. for 5 minutes. Purge the coated sample in N$_2$, and expose the coated sample to 360 J/cm$^2$ of UVB irradiation. Bake the coated sample for 10 minutes at 150° C. At this point the LCP film exhibited an in-plane retardance of approximately 36 nm, and its in-plane birefringence was measured to be 0.11 at 633 nm. The film was then incrementally exposed to doses of high intensity UV irradiation (Fusion UV lamp). The in-plane retardance thereof was measured to be decreasing as a function of exposure dose. Ultimately, after receiving a dose of approximately 40 J/cm$^2$ at 240 nm to 420 nm the in-plane retardance reached a level of approximately 3.7 nm, at which point it's in-plane birefringence was measured to be approximately 0.011 at 633 nm.

An alternative method for lowering the ΔN birefringence values of an LPP/LCP trim retarder and LPP/LCP coatings is similar to the method described above, but instead of fully curing the LCP layer with the UV radiation, the LCP layer is exposed to a reduced level of UV radiation, such that only a homogenously distributed fraction of molecules in the LCP layer are cured. Then the LPP/LCP coatings are subjected to an additional heating step to randomize the orientation of a homogeneously distributed fraction of uncured molecules of the LCP layer. Subsequently, the LCP layer is completely cured by a second exposure to UV radiation, fixing the randomized orientation of the fraction of the LCP molecules, which were previously uncured.

A detailed example of a method for manufacturing an LPP/LCP trim retarder with low ΔN birefringence properties due to a partial curing and heating is as follows. A 100 mm square×0.7 mm thick Corning-1737® glass substrate. AR coat on one side of the glass substrate. Spin coat the other side of the glass substrate for 60 seconds at 3000 rpm with an approximately 50 nm thick film of LPP, e.g. type SA2100® 2% in cyclopentanone. Bake the LPP film for 5 minutes at 180° C. Align the LPP by exposure to collimated linearly polarized light, e.g. 250 mJ/cm$^2$ @ wavelength approximately 300 nm to 340 nm, azimuthal orientation 0°, at normal incidence. Apply an LCP layer by spin coating directly on top of the LPP layer for 120 seconds @ 3000 rpm, e.g. type ROF-5103/50A® (50 wt %), Vantico AG. Anneal the coated sample at 51° C. for 5 minutes. Purge the coated sample in N$_2$, and expose the coated sample to 0.024 mJ/cm$^2$ of UVB irradiation. At this point the LCP film was partially crosslinked, and exhibited a measured in-plane retardance of 311.3 nm and an in-plane birefringence of 0.11 at 633 nm. The film was then heated to 150° C. for 10 minutes under N$_2$, and then cured by exposure to 1 J/cm$^2$ UVB, while at 150° C. and under N$_2$ atmosphere. Upon cooling back to room temperature, the in-plane retardance was measured to be 7.1 nm and the in-plane birefringence was approximately 0.0025.

Figure 15:
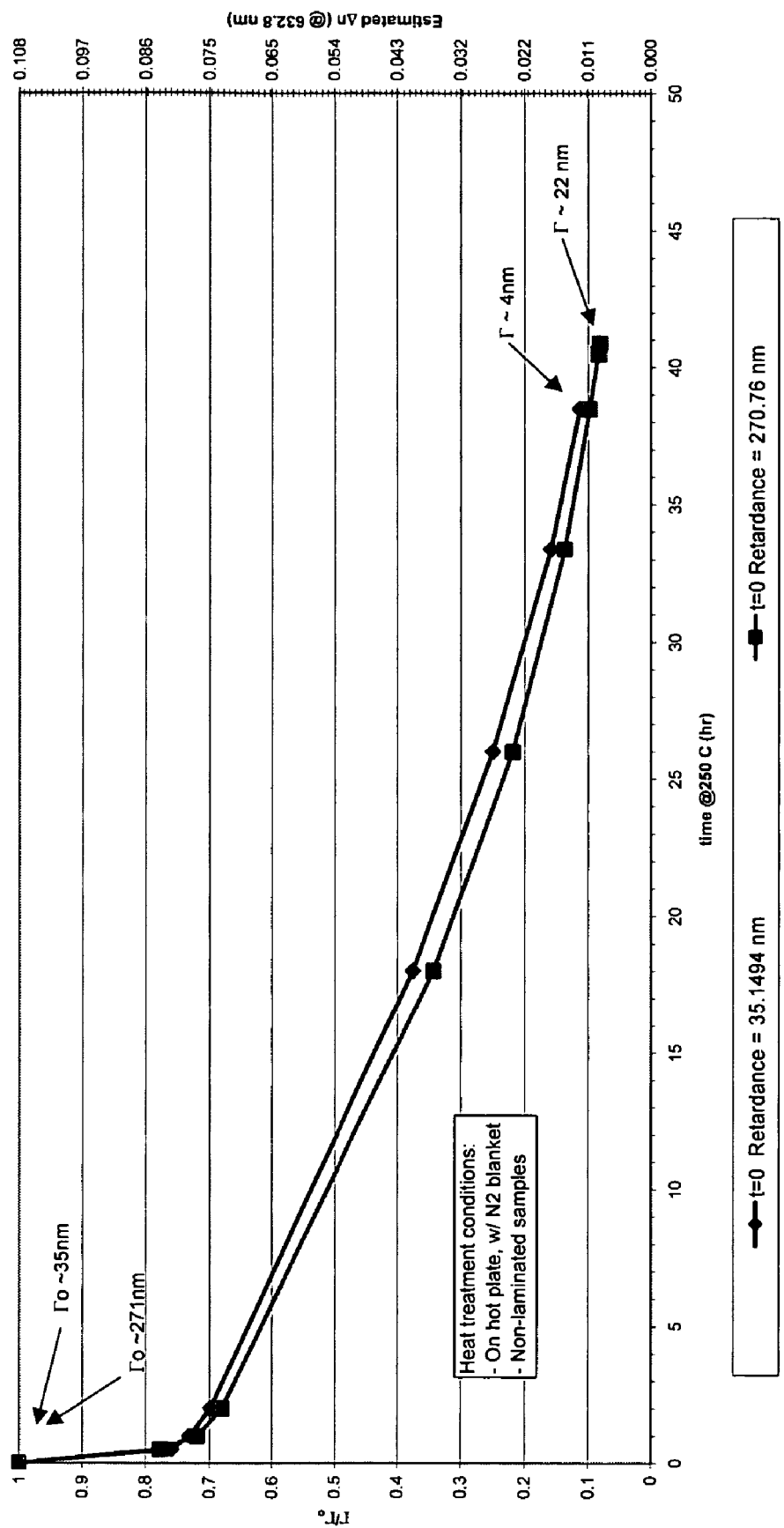
FIG. 15 is a plot of relative loss in retardance for LPP/LCP trim retarders vs. time of heat treatment at 250° C. in a nitrogen atmosphere.
Figure 16:
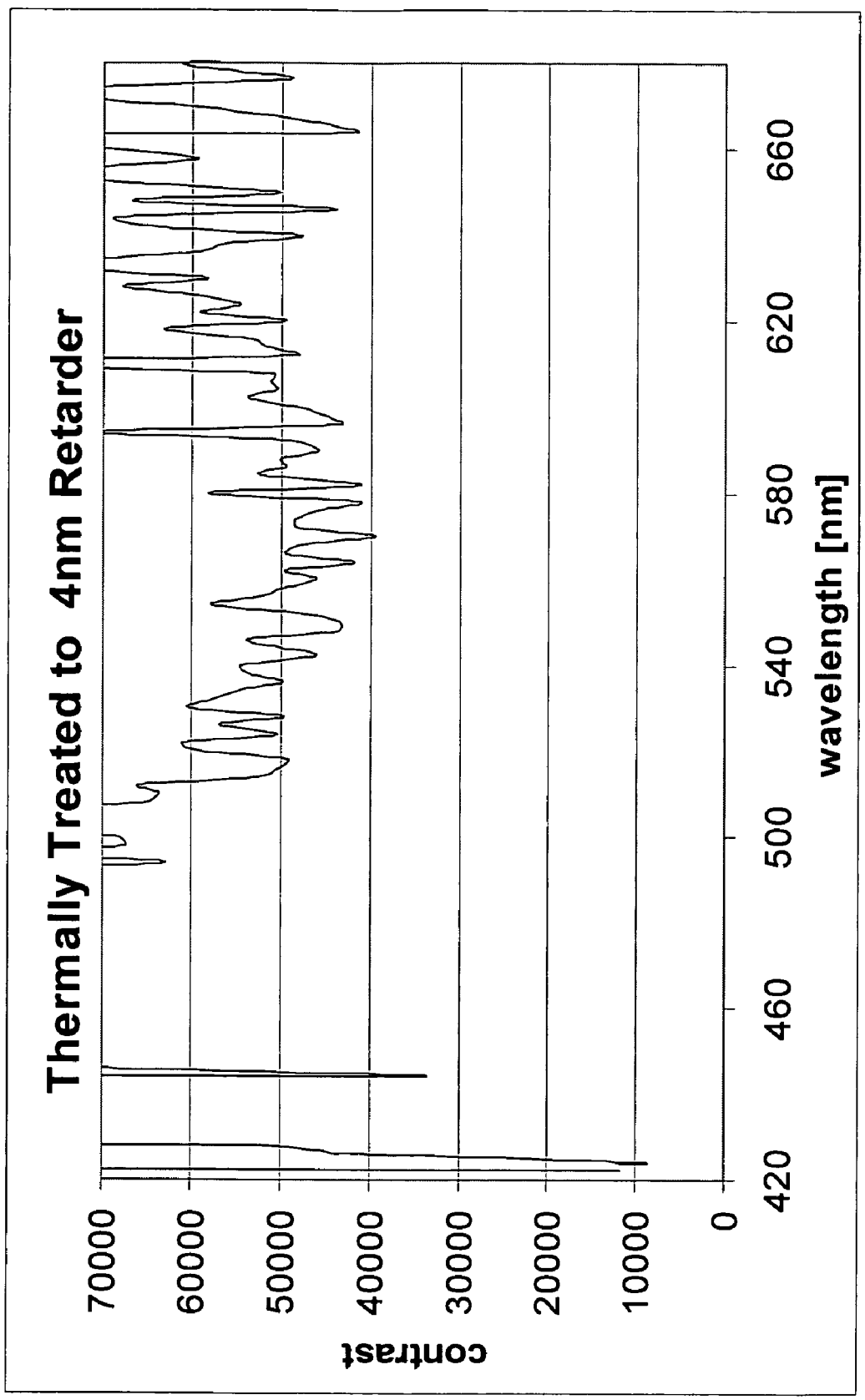
FIG. 16 is a plot of contrast of a LPP/LCP trim retarder thermally treated at 250° C. in a nitrogen atmosphere for a period of time required to develop a retardance of 4 nm vs. wavelength.

The ΔN birefringence values of LPP/LCP trim retarders and LPP/LCP coatings can also be decreased by exposing the cured LPP/LCP layers to elevated temperatures, e.g. between 50° C. and 250° C., preferably at 145° C. to 200° C., for extended periods of time, e.g. 30 to 60 hours, preferably 40 hours, in an non-oxidizing atmosphere. FIG. 15 illustrates the decrease in in-plane retardance, i.e. a decrease in in-plane ΔN, for LPP/LCP retarders of various starting in-plane retardance values induced by extended exposure, i.e. 0 to 50 hours, to elevated temperatures, i.e. 250° C. A plot of contrast vs. wavelength for a thermally treated LPP/LCP trim retarder is illustrated in FIG. 16.

A detailed example of a method for manufacturing an LPP/LCP trim retarder or LPP/LCP coatings with low in-plane ΔN birefringence properties due to extended exposure to thermal treatment is as follows. Clean a 100 mm square× 0.7 mm thick Corning-1737 glass substrate. AR coat one side of the glass substrate. Spin coat the other side of the glass substrate for 60 seconds at 3000 rpm with an approximately 50 nm thick film of LPP, e.g. type SA2100® 2% in cyclopentanone. Bake the LPP film for 5 minutes at 180° C. Align the LPP by exposure to collimated linearly polarized light, e.g. 40 mJ/cm$^2$ @ wavelength 300–340 nm, azimuthal orientation 0°, at normal incidence. Apply an LCP layer directly on top of the LPP layer by spin coating for 120 seconds @ 2300 rpm, e.g. type ROF-5103/50A® (50 wt %), Vantico AG. Anneal the coated sample at 51° C. for 10 minutes. Purge the coated sample in N$_2$ and expose the coated sample to 1 J/cm$^2$ of UVB irradiation. At this point the LCP film exhibited an in-plane retardance of approximately 271 nm, and an in-plane birefringence of 0.11 at 633 nm. The film was then baked at 250° C. for 40 hours. The in-plane retardance was measured to be decreasing as a function total time at 250° C. Ultimately the in-plane retardance reached a level of 21 nm, at which point the in-plane birefringence was measured to be approximately 0.009 at 633 nm. The film was than laminated to another AR coated substrate (AR coated on side opposite that which was laminated) by an adhesive, which was an appropriate optical adhesive with index of refraction similar to that of the substrate and/or LCP material.

LPP/LCP coating pairs made from a near homeotropic type LPP formulation, e.g. ROP-103/2CP® or ROP-119/2CP®; Rolic Technology Ltd., and a near homeotropic type LCP formulation, e.g. ROF5106/25A®; Rolic Technology LTD., when aligned to induce near homeotropic alignment of the LPP/LCP coatings, can be used to produce low in-plane ΔN birefringence values LPP/LCP trim retarders and LPP/LCP coatings without extended thermal or UV treatments. By exposing LPP ROP-103/2CP® or ROP-119/2CP® coating formulations to linear polarized light, while controlling the amount of light energy, the incident angle, and the azimuthal orientation of incidence of the polarized light used to cure the LPP polymer, the LPP layer can be oriented such that a near homeotropic orientation is induced in the near homeotropic type LCP formulation, e.g. ROF5106/25A®. Near homeotropic LCP coatings can achieve an optic axis orientation with an average tilt angle that is higher than formulations that do not possesses near homeotropic properties. As a result of a high average tilt angle the near homeotropic LCP coating have low in-plane ΔN birefringence. The in-plane ΔN birefringence of ROF5106/25A® can be lowered further by a short thermal treatment. As the LCP layer is cured a fraction of the LCP molecules, activated by the UV exposure, are trapped within the aligned matrix of the LCP layer. As the LPP/LCP film undergoes a short heat treatment the mobility of these reactive fractions increases, which allows the reactive fractions to react and crosslink. This secondary crosslink takes place while these areas of the matrix are randomly oriented and no longer contribute to the LCP layers in-plane ΔN birefringence. As a result, the in-plane ΔN birefringence of the LCP film is lower than that of the same film before the short thermal treatment.

Figure 17:
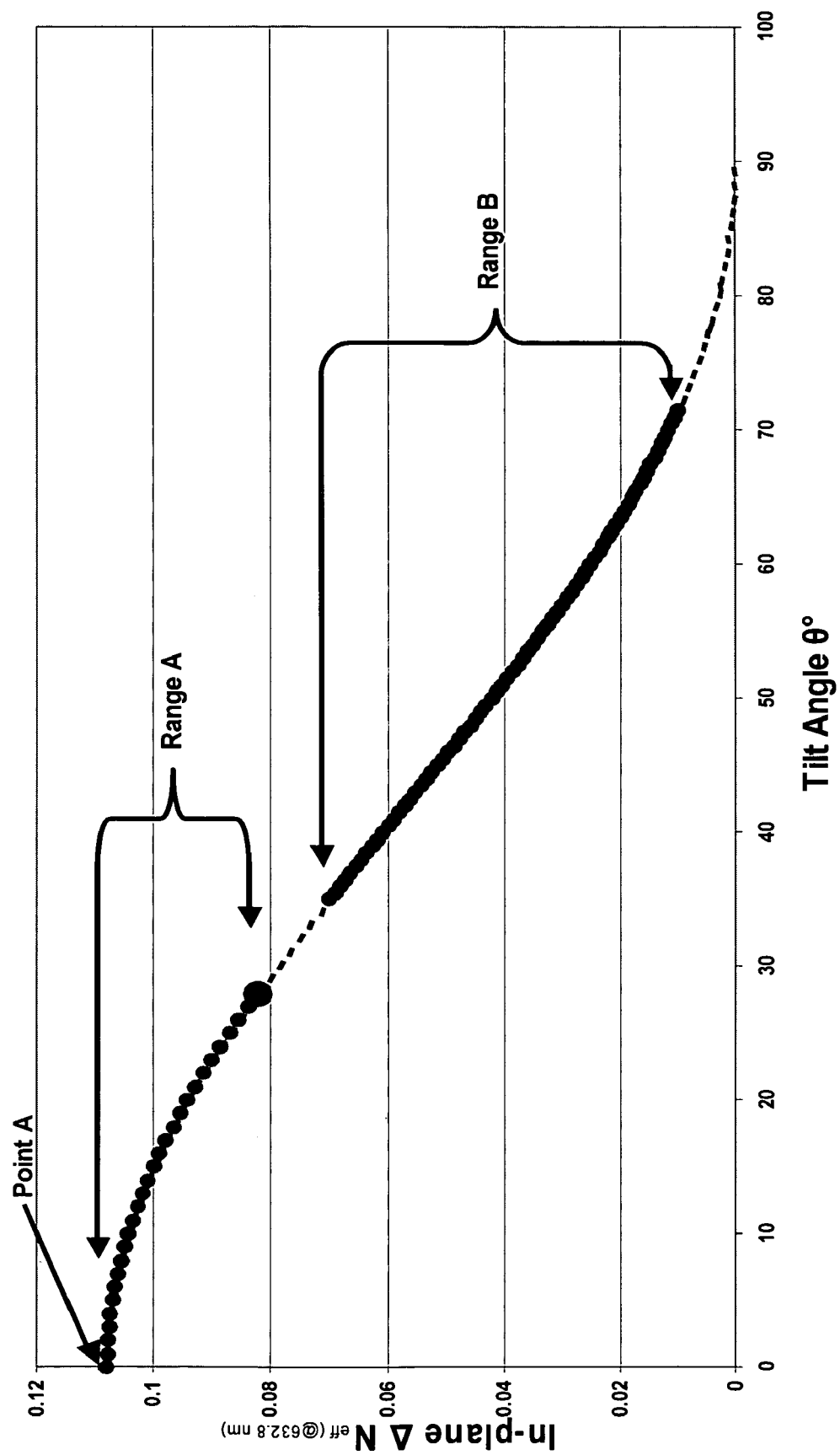
FIG. 17 is a plot of in-plane $\Delta N$ birefringence at 632.8 nm vs. LCP optic axis tilt angle.

FIG. 17 illustrates a plot of in-plane ΔN birefringence at 632.8 nm vs. LCP optic axis tilt angles. Point A represents an A-plate, which has no tilt angle, and the Range A represents the original LPP/LCP O-plate materials, which have tilt angles less than 28°. However, with the aforementioned near homeotropic LPP/LCP materials (Range B), tilt angles of between 35° and 75°, can be obtained, which corresponds to in-plane ΔN birefringence values of between 0.07 and 0.01.

For Example: While exposing an ROP-103/2CP® or an ROP-119/2CP® LPP coating formulation to linear polarized light, the amount of light energy, the incident angle, and the azimuthal orientation of incidence is used to orient the LPP, whereby a near homeotropic orientation can be induced in a near homeotropic type LCP formulation, e.g. ROF5106/25A®. The near homeotropic LCP coating can achieve an optic axis orientation with an average tilt angle that is higher than formulations that do not possess near homeotropic properties. As a result of a high average tilt angle the near homeotropic LCP coating has a low in-plane ΔN birefringence.

A general procedure for coating near homeotropic LPP/LCP layers with low intrinsic ΔN birefringence values LCP on substrates and producing LPP/LCP trim retarders is as follows. Clean a 100 mm square×0.7 mm thick Corning-1737® glass substrate. AR coat one side of the glass. Spin coat the other side of the glass for 60 seconds at 3000 rpm with an approximately 50 nm thick film of LPP (type ROP-119/2CP®, Rolic Research). Bake the LPP film for 15 minutes at 180° C. Align the LPP by exposing the LPP to collimated linearly polarized light, e.g. 1200 mJ/cm$^2$ @ wavelength 300~340 nm, azimuthal orientation 0°, angle of incidence 40° off normal. Apply an LCP layer by spin coating directly on top of the LPP layer for 120 seconds @ 3000 rpm, e.g. type ROF-5106/25A® (25 wt %), diluted to 18 wt % in anisole, Rolic Research. Anneal the coated sample at 51° C. for 5 minutes. Purge the coated sample in N$_2$, and expose the coated sample to 3 J/cm$^2$ of UVA irradiation. Bake the coated sample for 10 minutes at 150° C. Laminate the coated sample to another AR coated substrate (AR coated on side opposite that which was laminated) with an adhesive, which is an appropriate optical adhesive with index of refraction similar to that of the glass substrate and/or LCP material.

With reference to FIGS. 18 to 22, another embodiment of the present invention relates to decreasing reflections created at material interfaces by applying AR coatings based upon dielectric layers at those interfaces. The dielectric layers can be utilized independently, but preferably in combination with LCP layers with low ΔN birefringence values. The introduction of dielectric layers into the LPP/LCP trim retarder structure enables the introduction of other desirable features, e.g. filter out UV and IR radiation which can cause deterioration of the LCP/LPP layers, color correction, chemical barrier and physical barrier layers. The incorporation of anti-reflection dielectric coatings and ultraviolet light dielectric filters into polarization compensating elements improves the stability of the LPP/LCP trim retarder and the contrast performance thereof by decreasing the amount of light reflected back from the LPP/LCP trim retarders substrate/air interfaces. The dielectric layers consist of different layers of inorganic, polymer, organic-inorganic blends and/or composite materials, and may be monolithic or built out of a stack of sub-layers with a thickness of between 2 nm and 10 microns. Ideally, the dielectric layers consist of materials having a refractive index between 1.35 and 2.5. The dielectric layers can be optically isotropic or optically anisotropic. Preferably, the dielectric layers have >85% transmission in the spectral range between 380 nm to 780 nm.

In accordance with one embodiment of the present invention, dielectric layers are used to suppress spatial "retardance ripples" caused by multiple internal reflection and interference of light within a structure made out of a glass substrate, an LPP alignment layer and a birefringent LCP layer. Tests show that for a 20 nm LPP/LCP trim retarder coated on a glass substrate with no AR coatings, the peak-to-valley magnitude of the retardance ripple is approximately 3 to 5 nm. The spatial period of the ripples is typically observed to be on the order of 4 to 10 mm, and is related to the non-parallelism of the substrate.

The transmitted light is the combination of a primary single-pass beam, and a secondary multiply-internally-reflected beam of much lower amplitude. For simplicity the multiply-reflected beam is considered as the sum of all multiple reflection orders. Although the secondary beam may be quite small in amplitude compared to the primary beam, it exhibits much higher retardance due to its multiple passes through the LCP retarder layer. The total transmitted retardance is therefore the net effect of the retardances, intensities, and phase relation of the primary and secondary beams. The phase relation will vary spatially over the substrate, if the substrate does not have perfect parallelism. Thus, for certain substrate thicknesses there will be a constructive interference effect, i.e. a peak of ripples, while for other thicknesses the interference will be destructive, i.e. a valley of ripples.

Suppression of spatial retardance ripples is particularly important for applications which require a high degree of retardance uniformity. To eliminate the retardance ripples high antireflective coatings are applied to the interfaces, which contribute to multiple internal reflections resulting in consecutive constructive/destructive interference and the formation of the ripples. The purpose of the AR coating in this case is to greatly reduce the secondary beam's intensity contribution to the transmitted retardance, thereby suppressing the ripple magnitude, i.e. smaller peak-to-valley.

Figure 18:
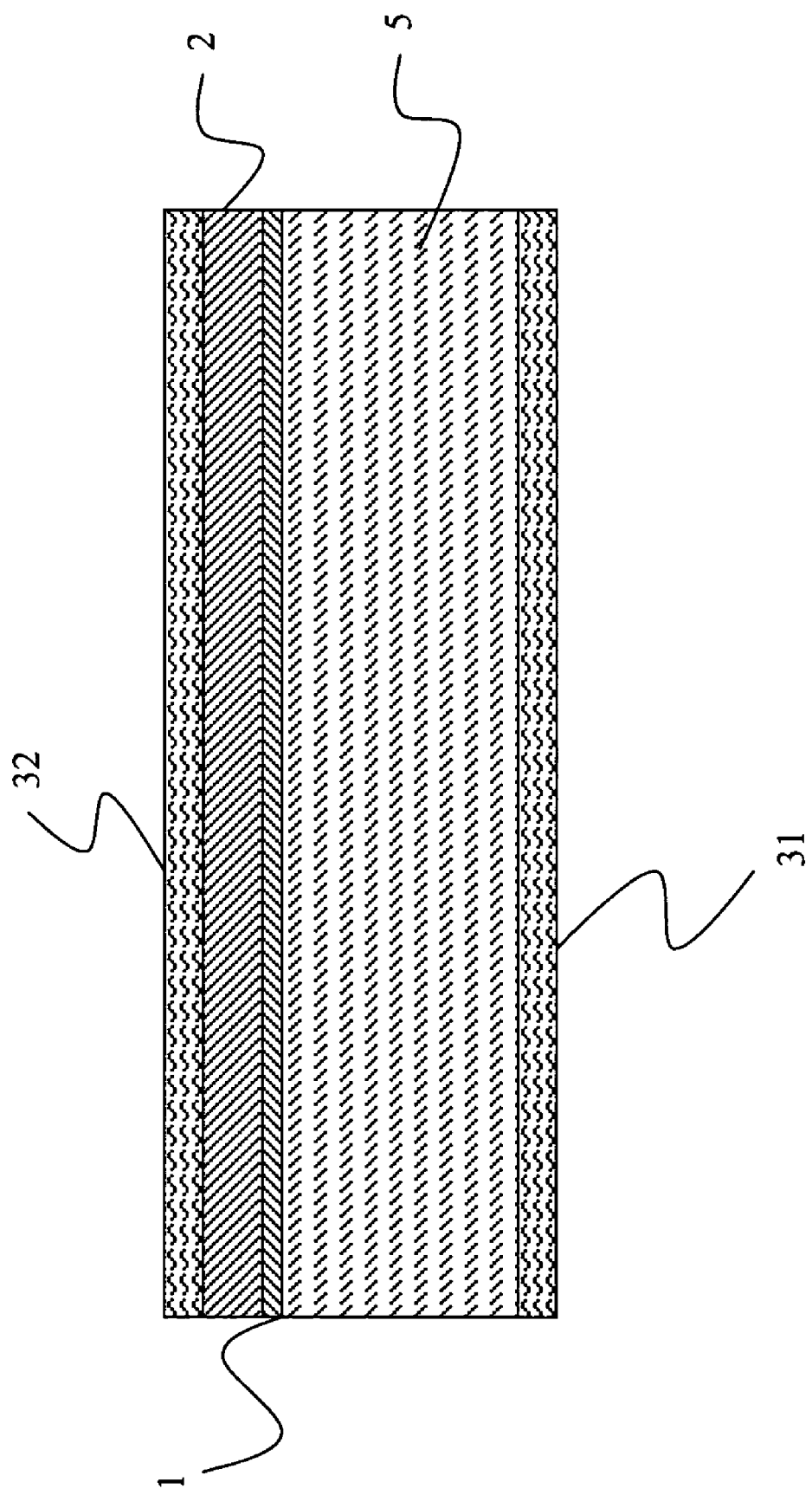
FIG. 18 is a cross-sectional view of a LPP/LCP trim retarder with dielectric layers on the outer surfaces thereof.

FIG. 18 illustrates a LPP/LCP trim retarder, which was fabricated as per the structure in FIG. 3 with an AR coating 31 on the external surface of the substrate 5 for refractive index matching the air/substrate interface, and an AR coating 32 on the external surface of the LCP layer 2 for refractive index matching the air/LCP layer interface, whereby the retardance ripple peak-to-valley magnitude is reduced down to approximately 0.15 nm to 0.25 nm.

Figure 19:
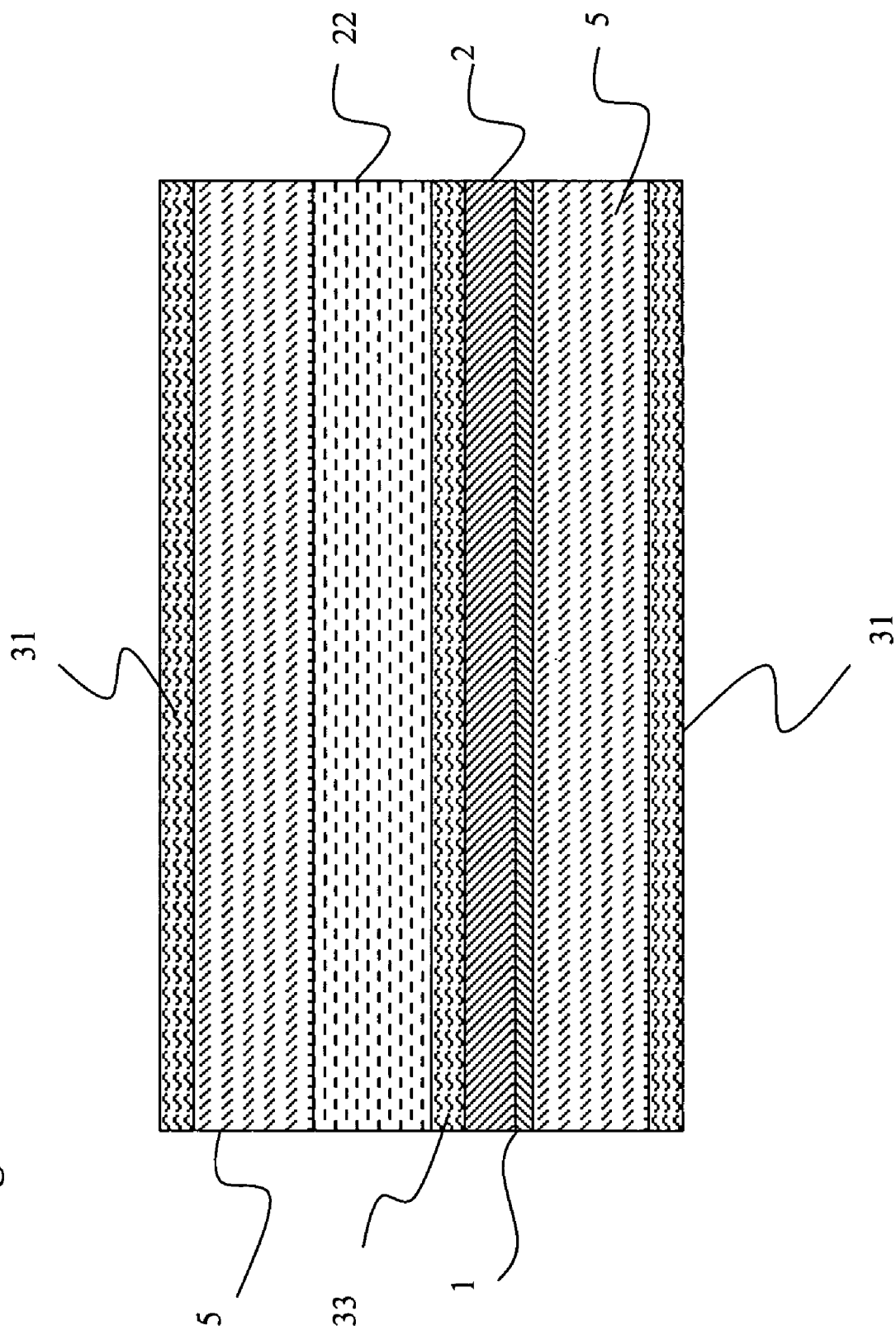
FIG. 19 is a cross-sectional view of a LPP/LCP trim retarder with a laminated second substrate and a dielectric layer between the LPP/LCP trim retarder and the second substrate.

There are also benefits of applying additional dielectric layers in a laminated, AR coated retarder structure, i.e. minimizing the amount of polarization conversion occurring on the interfacial boundaries within the LPP/LCP trim retarder. With reference to FIG. 19, a 45 nm thick layer of a polymeric dielectric 33 with a refractive layer to match those of the LCP 2 and the laminating polymer 22. As a result we obtained a laminated LPP/LCP trim retarder with decreased amounts of internal reflections and thus with improved functionality. The adhesive layer 22 has a index of refraction nominally equivalent to the average index of refraction of the LCP layer 2 and the substrate 5 in contact therewith.

Figure 20:
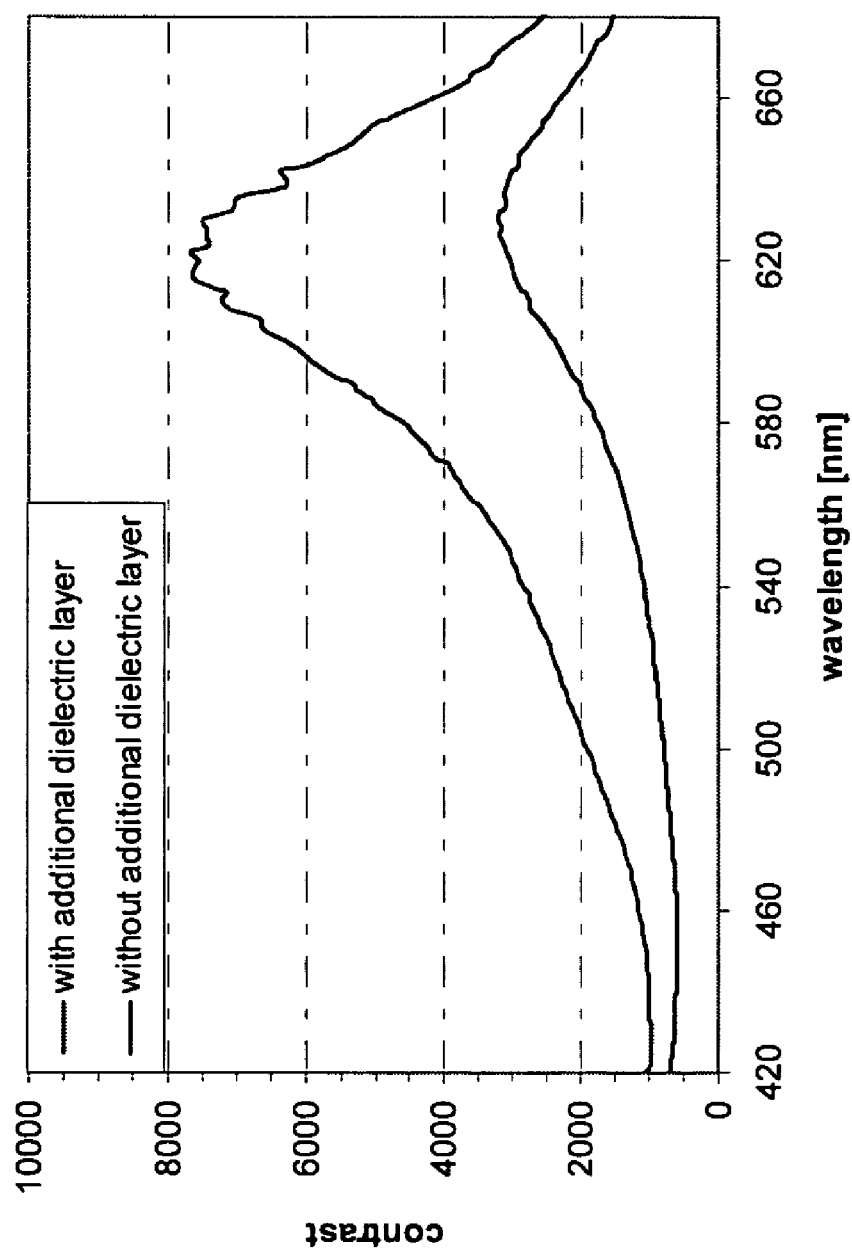
FIG. 20 is a plot of contrast vs. wavelength for the LPP/LCP trim retarder of FIG. 19 with and without the dielectric layer.
Figure 21A:
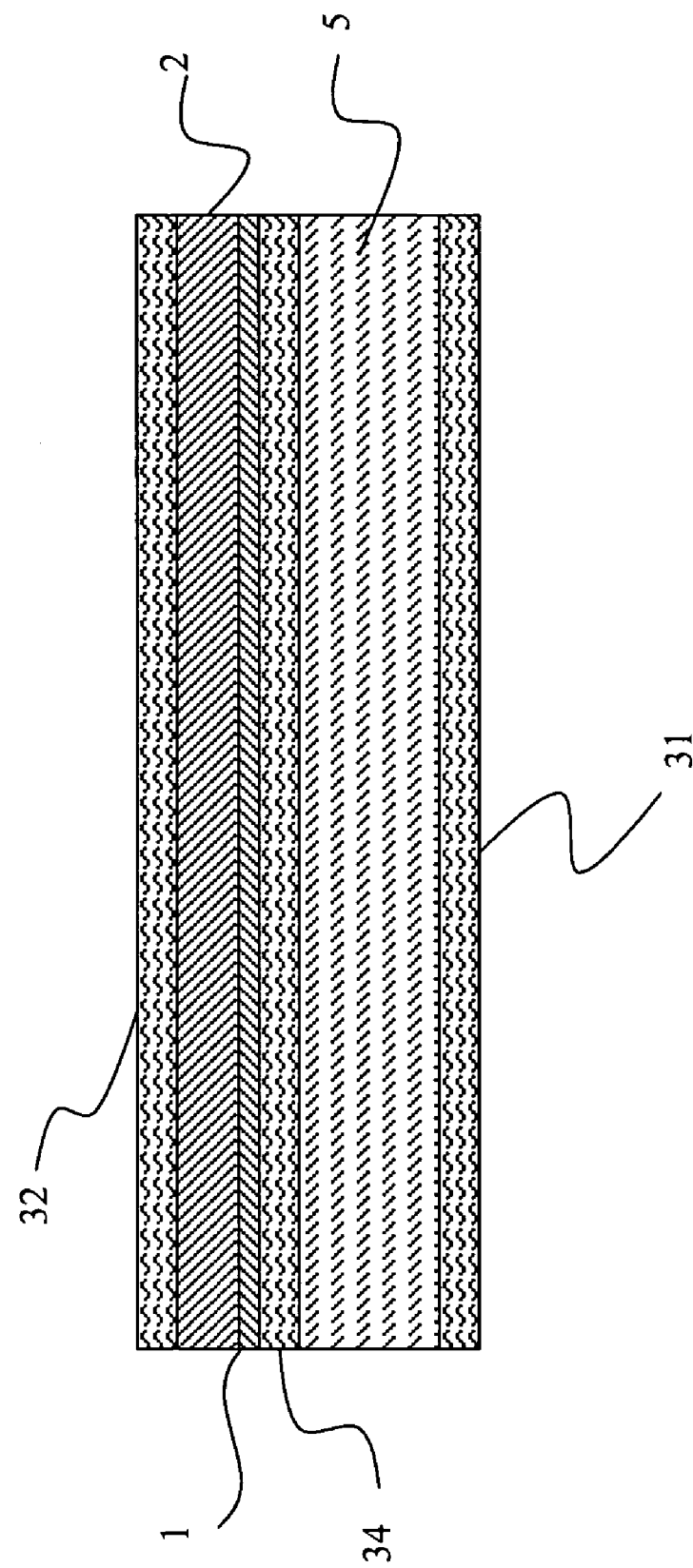
FIG. 21a is a cross-sectional view of a LPP/LCP trim retarder with dielectric layers on both sides of the substrate.
Figure 21B:
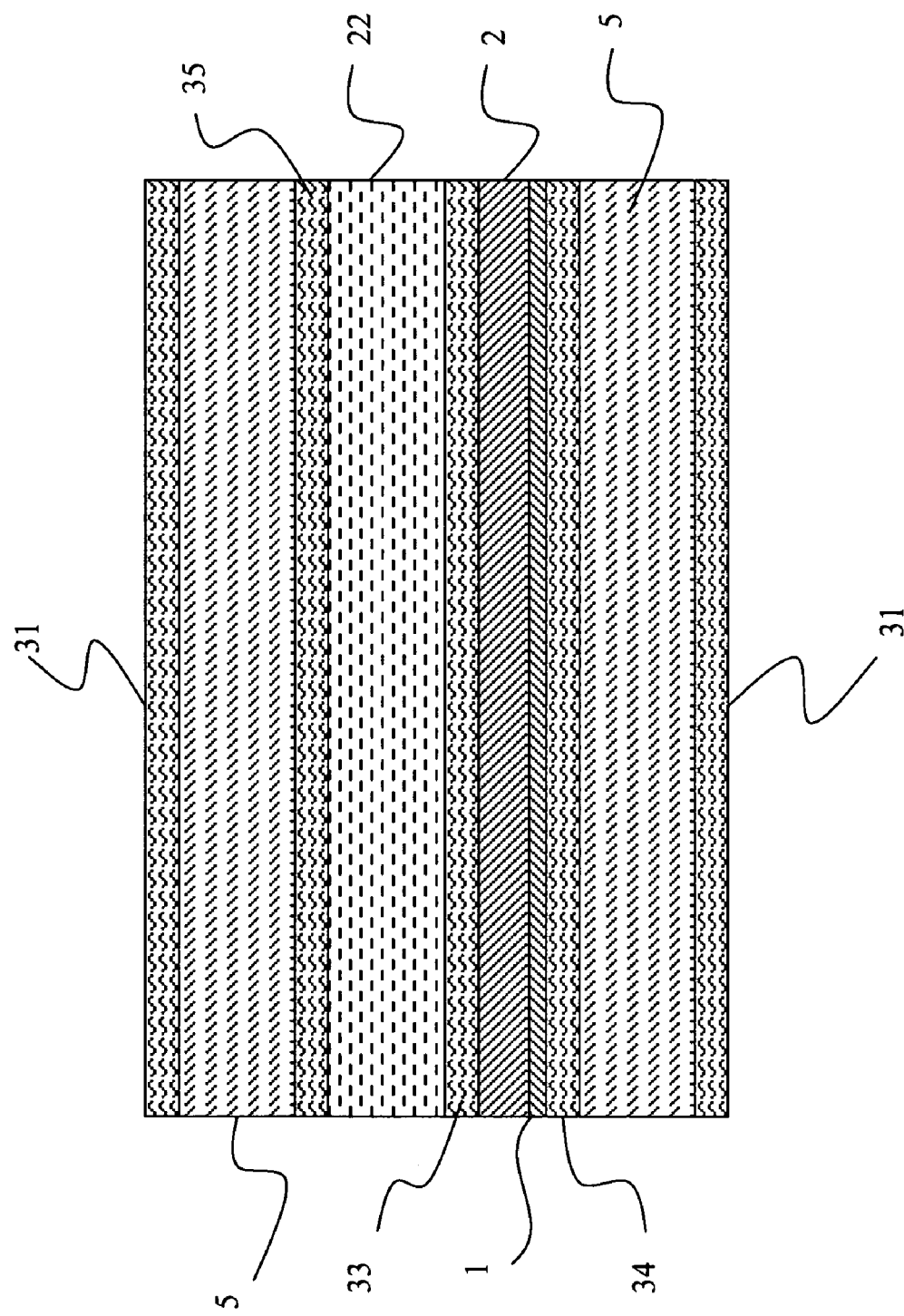
FIG. 21b is a cross-sectional view of a LPP/LCP trim retarder with dielectric layers on both sides of both substrates and in between the other layers.

A measure of polarization conversion due to reflections occurring at the various interfaces is the amount of light reflecting off of the LPP/LCP trim retarder in a polarization state orthogonal to the incident state, which is compared to the light passing through the LPP/LCP trim retarder. In an ideal system, in which there is no polarization conversion of the reflected light, the contrast is infinite. FIG. 20 illustrates the contrast for a 20 nm retarder as seen in FIG. 19, illuminated from the top, with and without the additional dielectric layer 33 between the laminated layer 22 and the birefringent LCP layer 2. The additional dielectric layer 33 improves the contrast and reduces polarization conversion.

Figure 22A:
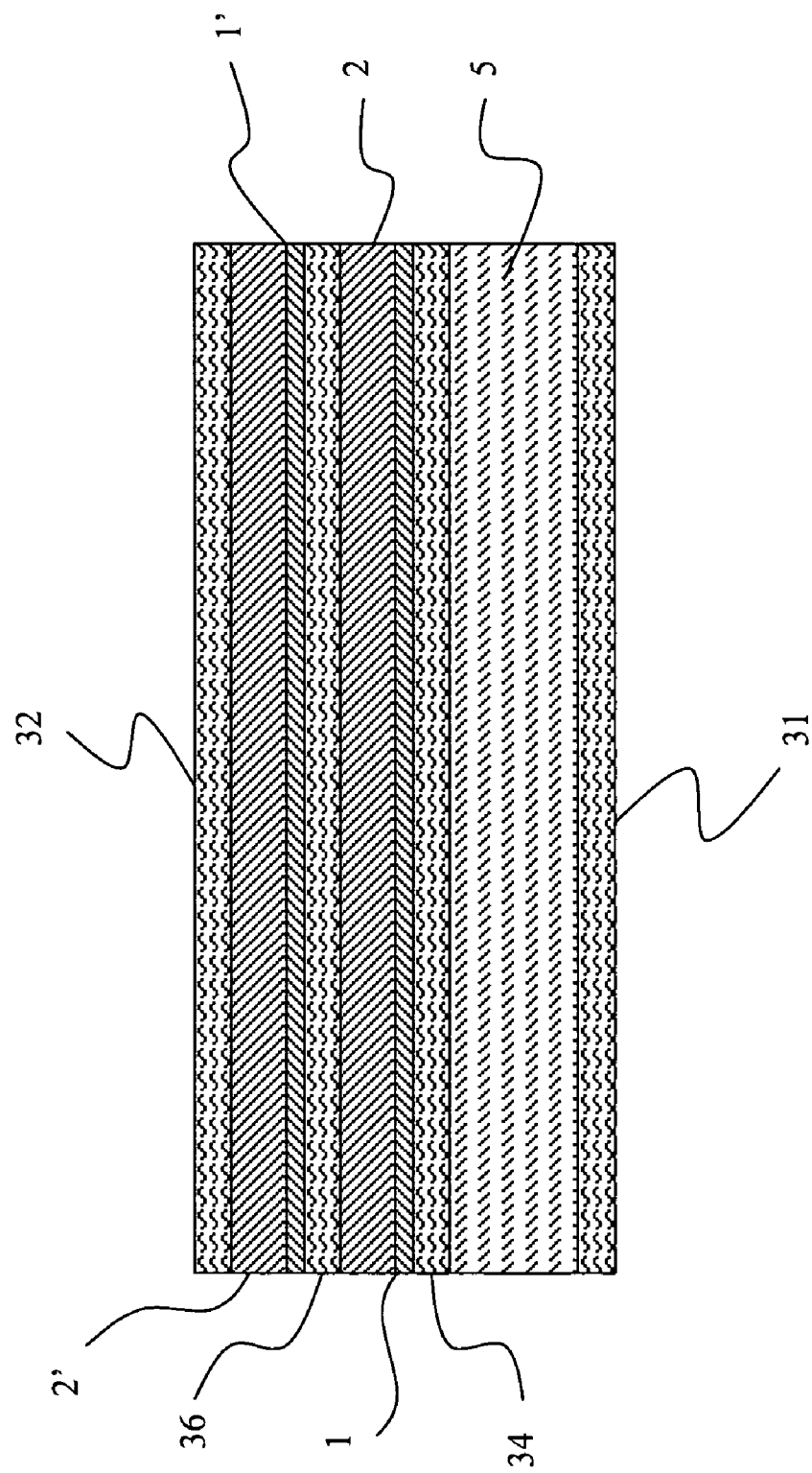
FIG. 22a is a cross-sectional view of a multiple layer LPP/LCP trim retarder with dielectric layers on both sides of the substrate and in between the other layers.
Figure 22B:
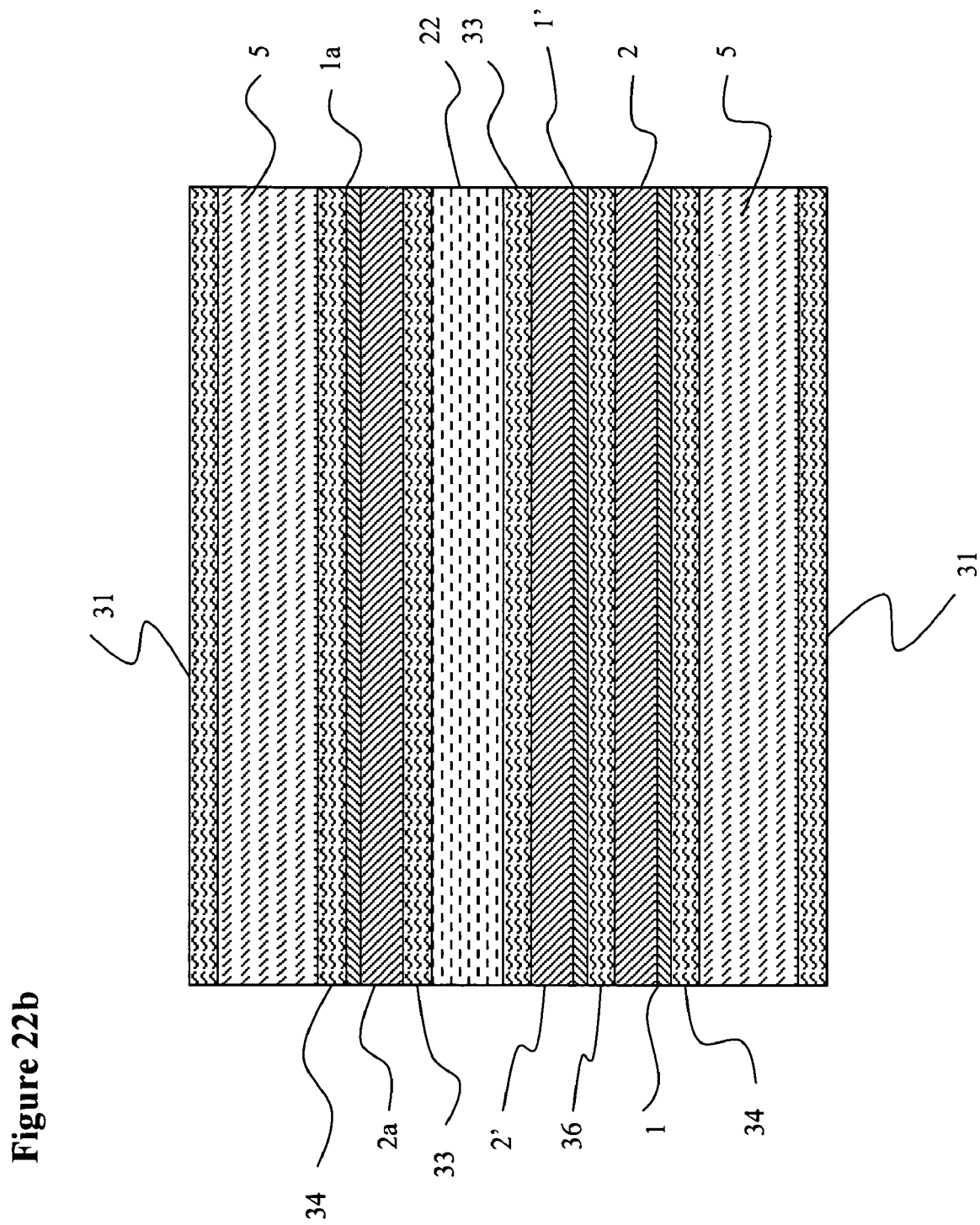
FIG. 22b is a cross-sectional view of a laminated LPP/LCP trim retarder with dielectric layers on both sides of both substrates and in between the other layers.

FIGS. 21a, 21b, 22a and 22b illustrate other embodiments of the present invention in which dielectric layers are disposed between the various layers thereof. In the LPP/LCP trim retarder illustrated in FIGS. 21a and 21b dielectric film layers 34 and 35 are coated onto the surface of the substrates 5 prior to the LPP layer 1 and the adhesive layer 22, respectively. With reference to FIGS. 22a and 22b, which illustrate multiple layer and laminated LPP/LCP trim retarders, respectively, as in FIGS. 4 and 8, dielectric film layers 36 are further deposited between the LCP layer 2 of the first LPP/LCP pair and the LPP layer 1' of the second LPP/LCP pair for refractive index matching therewith.

Figure 23:
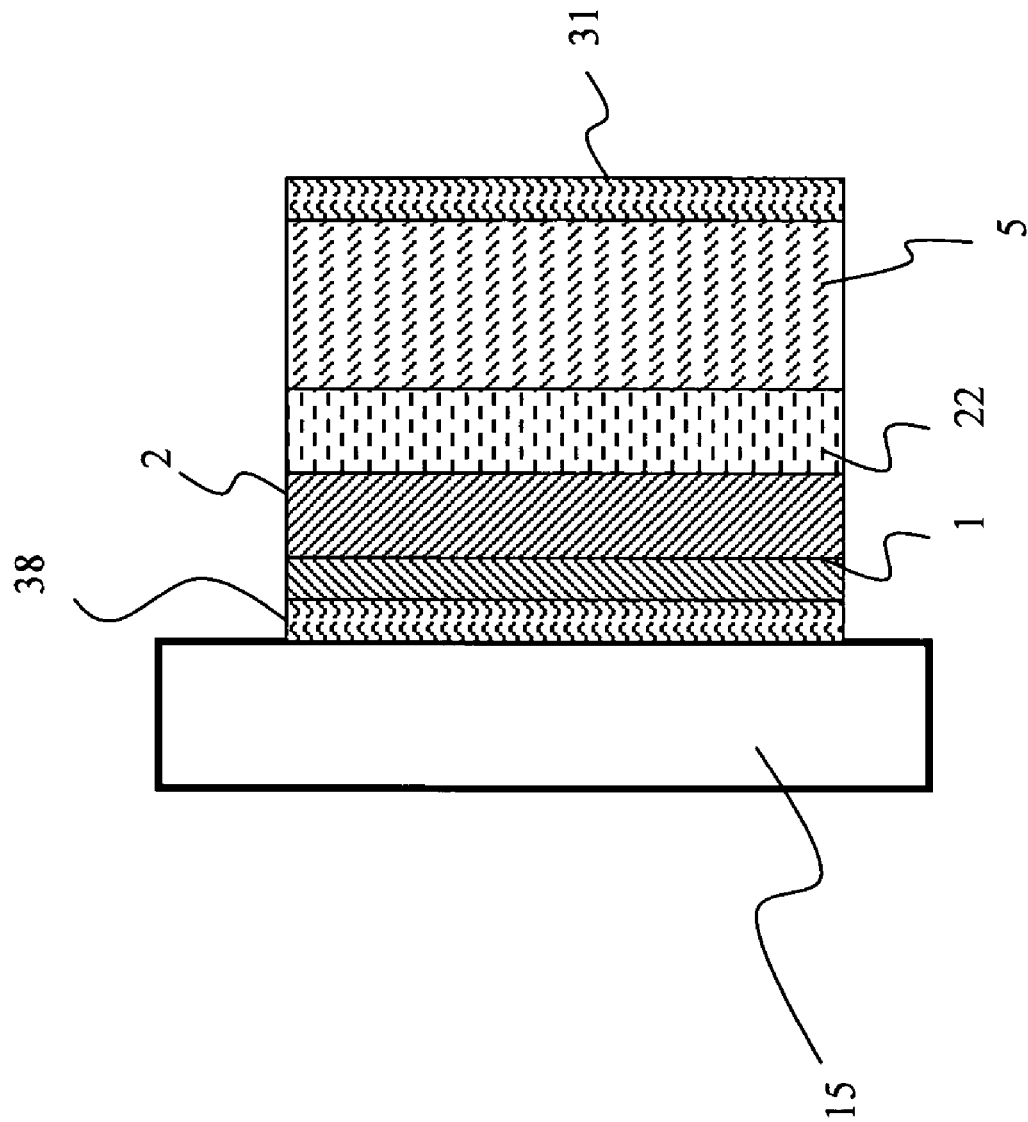
FIG. 23 is a cross-sectional view of a LPP/LCP trim retarder deposited directly onto a LC display panel.
Figure 24:
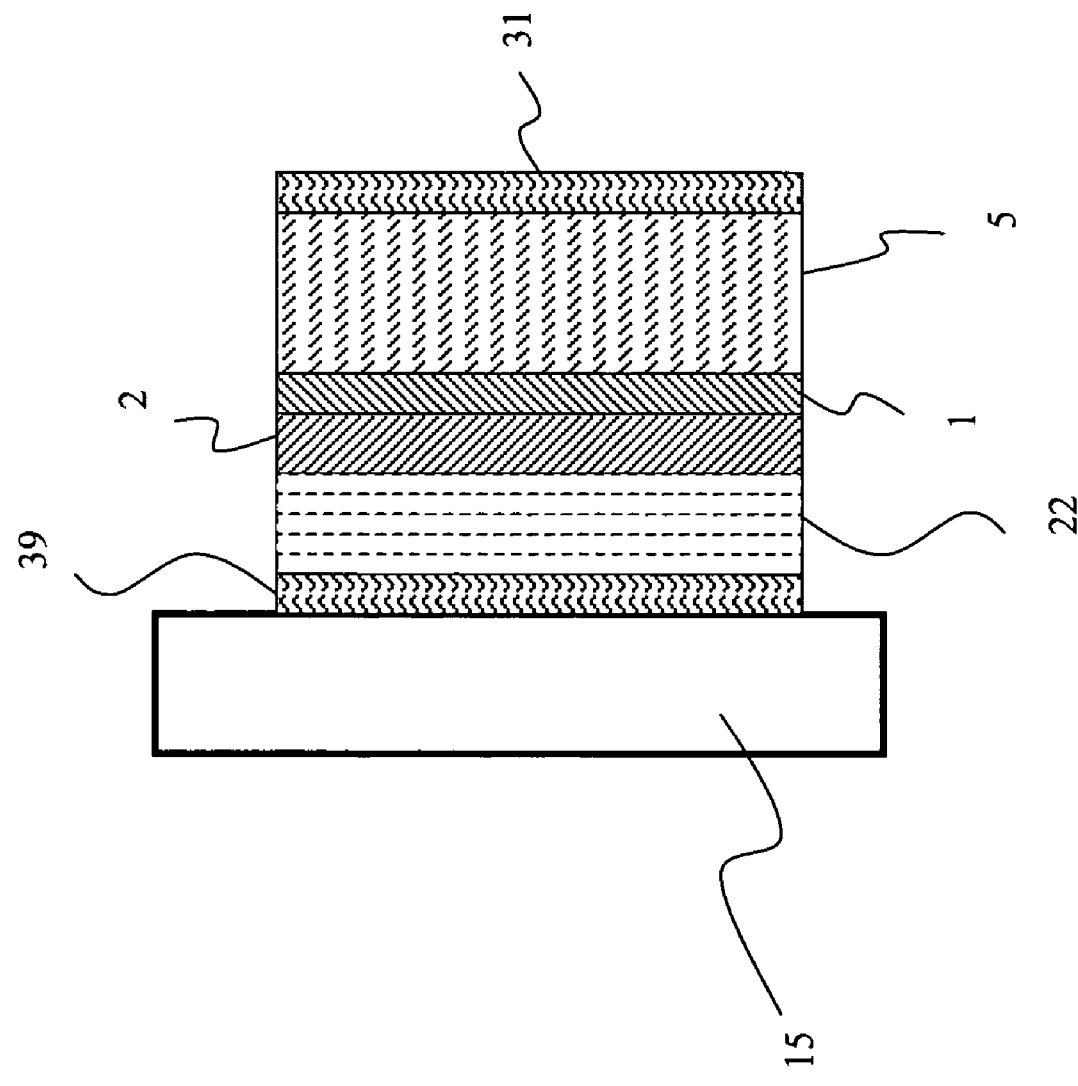
FIG. 24 is a cross-sectional view of an LPP/LCP trim retarder laminated onto a LC display panel.

With reference to FIG. 23, the LPP/LCP trim retarder according to the present invention can be coated directly onto the LCoS display panel 15 forming a one piece liquid crystal display assembly. Dielectric layers 38 acting as an AR coating are preferably deposited between the LCoS panel 15 and the LPP/LCP trim retarder. The air/substrate AR coating 31 is deposited on the substrate 5, which is laminated to the LCP layer 2 with the adhesive layer 22. The substrate 5 and the adhesive layer 22 could also be removed leaving the LPP layer 1 and the LCP layer 2 supported by the LCoS display panel 15.

Alternatively, the LPP layer 1 and the LCP layer 2 can be coated on the substrate 5, and then laminated onto the LCoS display panel 15 utilizing a suitable adhesive 22. AR coating 31 is again deposited at the air/substrate interface, while an AR coating 39 is deposited at the adhesive/display panel interface. Again, the substrate 5 can be removed leaving the LPP layer 1 and the LCP layer 2 supported by the LCoS display panel 15.

We claim:

1. A liquid crystal (LC) display assembly for reducing back-reflection polarization conversion comprising:
   an LC display panel having residual birefringence in a dark state due to the orientation of liquid crystal molecules therein; and
   a polarization compensating element for at least partially compensating for the residual birefringence including:
      a first polymeric photo aligned (LPP) layer; and
      a first cured photo-polymerizable liquid crystal polymer (LCP) layer mounted on said first LPP layer;
   wherein an in-plane fast axis orientation of the first LCP layer is substantially azimuthally aligned at an angle between 0° and 90° relative to an in-plane slow axis of the LC display panel; and
   wherein the LCP layer has a relatively low in-plane ΔN birefringence value between 0.0001 and 0.14 in the blue portion of the visible spectrum and between 0.0001 and 0.104 in the red portion of the visible spectrum.

2. The assembly according to claim 1, wherein the relatively low in-plane ΔN birefringence value is between 0.0001 and 0.07 in the visible spectrum.

3. The assembly according to claim 1, wherein the first LCP layer includes isotropic organic compounds for providing the relatively low in-plane ΔN birefringence values.

4. The assembly according to claim 1, wherein the first LCP layer has a near homeotropic alignment providing the relatively low in-plane birefringence value.

5. The assembly according to claim 1, further comprising a first transparent substrate for supporting the first LPP layer; wherein said first transparent substrate is coated on one or more surfaces with a plurality of thin film dielectric layers for suppressing spatial retardance ripples.

6. The assembly according to claim 1, further comprising a second LPP layer adjacent said first LCP layer; and a second LCP layer mounted on said second LPP layer.

7. The assembly according to claim 6, wherein an optic axis of the second LCP layer is aligned at an azimuthal angle between 0° and 90° relative to an optic axis of the first LCP layer.

8. The assembly according to claim 7, further comprising a second transparent substrate; a third LPP layer adjacent the second transparent substrate; a third LCP layer mounted on the third LPP layer; and an adhesive layer for attaching the third LCP layer to the second LCP layer.

9. The assembly according to claim 8, wherein a plurality of thin film dielectric layers are disposed on one or both sides of the second transparent substrate for minimizing the amount of polarization conversion occurring therebetween.

10. The assembly according to claim 1, further comprising a second transparent substrate; and an adhesive layer for attaching the second transparent substrate to the first LCP layer.

11. The assembly according to claim 10, wherein a plurality of thin film dielectric layers are disposed on one or both sides of the second transparent substrate for minimizing the amount of polarization conversion occurring therebetween.

12. A method of manufacturing a liquid crystal display assembly comprising:
   a) providing a transparent substrate;
   b) depositing the LPP layer on one side of the transparent substrate;
   c) exposing the LPP layer to linearly polarized light for aligning LPP molecules therewith;

d) depositing the LCP layer on the LPP layer forming a coated sample;
e) annealing the coated sample to accelerate alignment of the LCP layer with the LPP layer;
f) curing the coated sample by exposing the coated sample to ultra-violet or e-beam radiation
g) reducing an in-plane ΔN birefringence value of the LCP layer between 0.0001 and 0.14 in the blue portion of the visible spectrum and between 0.0001 and 0.104 in the red portion of the visible spectrum; and
h) mounting the coated sample on a liquid crystal display panel.

13. The method according to claim 12, wherein step g) comprises:
   $g_1$) baking the coated sample for 20 to 50 hours at 50° C. to 250° C. to reduce the in-plane ΔN birefringence value between 0.001 and 0.07 in the visible spectrum.

14. The method according to claim 12, wherein step g) comprises:
   $g_2$) exposing the coated sample to a higher dose of ultra-violet or e-beam radiation to reduce the in-plane ΔN birefringence value to between 0.001 and 0.07 in the visible spectrum.

15. The method according to claim 12, wherein step f) includes:
   an initial partially curing step by exposure to ultra-violet or e-beam radiation; and
   wherein step g) includes
   an additional heating step to randomize a homogenously distributed fraction of molecules in the LCP layer not fully cured to reduce the in-plane ΔN birefringence value between 0.001 and 0.07 in the visible spectrum; and
   a final curing step by exposure to ultra-violet or e-beam radiation.

16. A method of manufacturing a trim retarder comprising:
a) providing a transparent substrate;
b) depositing the LPP layer on one side of the transparent substrate;
c) exposing the LPP layer to linearly polarized light for aligning LPP molecules therewith;
d) depositing the LCP layer on the LPP layer forming a coated sample;
e) annealing the coated sample to accelerate alignment of the LCP layer with the LPP layer;
f) curing the coated sample by exposing the coated sample to ultra-violet or e-beam radiation; and
g) reducing the in-plane ΔN birefringence value of the LCP layer to less than 0.07 in the visible spectrum.

17. The method according to claim 16, wherein step g) comprises:
   $g_1$) baking the coated sample for 20 to 50 hours at 50° C. to 250° to reduce the in-plane ΔN birefringence value to less than 0.07 in the visible spectrum.

18. The method according to claim 16, further comprising:
   $g_2$) exposing the coated sample to a higher dose of ultra-violet or e-beam radiation to reduce the in-plane ΔN birefringence value to less than 0.07 in the visible spectrum.

19. The method according to claim 16, wherein step f) includes:
   an initial partially-curing step by exposure to ultra-violet or e-beam radiation;
   an additional heating step to randomize portions of the LCP layer not fully cured to reduce the in-plane ΔN birefringence value to less than 0.07 in the visible spectrum; and
   a final curing step by exposure to ultra-violet or e-beam radiation.

* * * * *